(12) United States Patent
Rosenan

(10) Patent No.: US 9,424,430 B2
(45) Date of Patent: Aug. 23, 2016

(54) METHOD AND SYSTEM FOR DEFENDING SECURITY APPLICATION IN A USER'S COMPUTER

(75) Inventor: Avner Rosenan, Yehud (IL)

(73) Assignee: SAFEND LTD., Tel Aviv (IL)

(*) Notice: Subject to any disclaimer, the term of this patent is extended or adjusted under 35 U.S.C. 154(b) by 755 days.

(21) Appl. No.: 12/301,658

(22) PCT Filed: May 21, 2007

(86) PCT No.: PCT/IL2007/000609
§ 371 (c)(1),
(2), (4) Date: Sep. 8, 2009

(87) PCT Pub. No.: WO2007/135672
PCT Pub. Date: Nov. 29, 2007

(65) Prior Publication Data
US 2010/0011200 A1    Jan. 14, 2010

Related U.S. Application Data

(60) Provisional application No. 60/803,058, filed on May 24, 2006.

(51) Int. Cl.
G06F 21/57 (2013.01)
G06F 21/71 (2013.01)
G06F 21/78 (2013.01)

(52) U.S. Cl.
CPC .............. G06F 21/575 (2013.01); G06F 21/71 (2013.01); G06F 21/78 (2013.01)

(58) Field of Classification Search
CPC ........ G06F 21/575; G06F 21/71; G06F 21/78
USPC ................................. 713/193; 726/27, 32–33
See application file for complete search history.

(56) References Cited

U.S. PATENT DOCUMENTS 5,058,162 A * 10/1991 Santon ..................... G06F 21/10
380/281
5,282,247 A *  1/1994 McLean ................... G06F 21/78
711/164
5,919,257 A *  7/1999 Trostle .................. G06F 21/575
726/22

(Continued)

FOREIGN PATENT DOCUMENTS

EP    0961193    12/1999
EP    1273996    1/2003

(Continued)

OTHER PUBLICATIONS

Winmagic Data Security: Enterprise Full Disk Encryption Solutions; Winmagic Inc; Nov. 2006.*

(Continued)

Primary Examiner — James Turchen
(74) Attorney, Agent, or Firm — Eitan, Mehulal & Sadot

(57) ABSTRACT

Protecting the integrity and the effectiveness of a security agent that is installed in a user's device while the user's device operates online or offline. The security agent may be used for enforcing a security policy required by an organization or network to which the user's computer belongs. One aspect of exemplary embodiments of the present invention is to associate the content of one or more storage devices of the user's computer with the security agent and with a boot-loader program used by the user's computer.

20 Claims, 8 Drawing Sheets

(56) References Cited

U.S. PATENT DOCUMENTS

| | | | |
|---|---|---|---|
| 6,189,100 B1* | 2/2001 | Barr | G06F 21/575 380/255 |
| 6,216,230 B1* | 4/2001 | Rallis | G06F 21/34 713/172 |
| 6,473,861 B1* | 10/2002 | Stokes | G11B 20/00086 713/193 |
| 6,775,778 B1* | 8/2004 | Laczko, Sr. | G06F 21/51 380/2 |
| 6,836,888 B1* | 12/2004 | Basu | G06F 21/57 713/164 |
| 6,907,522 B2* | 6/2005 | Morais | G06F 21/575 711/102 |
| 7,237,121 B2* | 6/2007 | Cammack | G06F 21/575 380/255 |
| 7,552,326 B2* | 6/2009 | Liu | G06F 21/57 713/164 |
| 2003/0056107 A1* | 3/2003 | Cammack | G06F 21/575 713/189 |
| 2003/0126434 A1 | 7/2003 | Lim et al. | |
| 2003/0188179 A1 | 10/2003 | Challener et al. | |
| 2005/0114686 A1 | 5/2005 | Ball et al. | |
| 2005/0182919 A1* | 8/2005 | Dellow | G06F 21/71 712/227 |
| 2005/0204155 A1* | 9/2005 | Ravi | G06F 21/575 726/22 |
| 2006/0015732 A1* | 1/2006 | Liu | G06F 21/57 713/176 |
| 2006/0026423 A1* | 2/2006 | Bangerter | H04L 9/3218 713/164 |
| 2006/0090084 A1* | 4/2006 | Buer | G06F 21/53 713/189 |
| 2006/0095970 A1* | 5/2006 | Rajagopal | G06F 21/577 726/25 |
| 2006/0101310 A1* | 5/2006 | Diamant | G06F 21/12 714/38.14 |
| 2006/0161790 A1* | 7/2006 | Hunter | G06F 21/575 713/189 |
| 2006/0227773 A1* | 10/2006 | Grewal | H04L 63/123 370/389 |
| 2007/0079120 A1* | 4/2007 | Bade | G06F 21/57 713/166 |
| 2007/0107056 A1* | 5/2007 | Frank | G06F 11/0751 726/22 |
| 2008/0028235 A1* | 1/2008 | Smith | G06F 21/575 713/190 |
| 2008/0098212 A1* | 4/2008 | Helms | H04L 63/0428 713/155 |
| 2008/0305792 A1* | 12/2008 | Khetawat | H04W 88/12 455/435.1 |
| 2009/0205045 A1* | 8/2009 | Horvath | G06F 21/575 726/23 |
| 2009/0254753 A1* | 10/2009 | De Atley | G06F 21/51 713/176 |
| 2010/0106976 A1* | 4/2010 | Aciicmez | G06F 21/64 713/189 |
| 2010/0111294 A1* | 5/2010 | Soppera | G06Q 10/08 380/28 |

FOREIGN PATENT DOCUMENTS

| | | |
|---|---|---|
| WO | WO 01/31839 | 5/2001 |
| WO | WO 2005/054973 | 6/2005 |
| WO | WO 2006/043023 | 4/2006 |
| WO | WO 2006/070353 | 7/2006 |

OTHER PUBLICATIONS

Perez, R., Sailer, R., & van Doorn, L. (Jul. 2006). vTPM: virtualizing the trusted platform module. In Proc. 15th Conf. on USENIX Security Symposium (pp. 305-320).*

Jansen, B., Ramasamy, H., & Schunter, M. (Aug. 2006). Flexible integrity protection and verification architecture for virtual machine monitors. In Second Workshop on Advances in Trusted Computing.*

Winmagic SecureDoc PC Disk Encryption Product Evaluation, Aug. 11, 2003.

International Search Report for International Application No. PCT/IL07/00609 mailed Jul. 28, 2008.

Extended European Search Report mailed on Nov. 9, 2012 for corresponding European Application No. 07736349.7.

Garfinkel T: "Terra: a virtual machine-based platform for trusted computing", ACM SOSP, Proceedings of the ACM Symposium on Operating Systemsprinciples; Oct. 19, 2003, pp. 193-206, XP002340992.

Office Action of European Patent Application No. 07736349.7 mailed on Dec. 6, 2013.

* cited by examiner

METHOD AND SYSTEM FOR DEFENDING SECURITY APPLICATION IN A USER'S COMPUTER

CROSS-REFERENCE TO RELATED APPLICATIONS

This application is a National Phase Application No. PCT/IL2007/000609, entitled "Method and System for Defending Security Application in a User's Computer", International filing date May 21, 2007, published on Nov. 29, 2007 as International Publication No. WO 2007/135672, which in turn claims priority from U.S. Provisional Patent Application No. 60/803,058, filed May 24, 2006, both of which are incorporated herein by reference in their entirety.

FIELD OF THE INVENTION

The present invention relates to the field of security of organizational private network and, more particularly, to protecting the integrity of one or more security applications that are installed in a user's computer.

BACKGROUND OF THE INVENTION

Commercial corporations, enterprises, organizations, such as government bodies, health care providers, military organizations, financial institutes, etc., face several computer security concerns. One of these concerns is the leakage of information from their internal computer network to the outside world. The threat of information leakage may come from outsiders attempting to hack into the organization's computers system as well as from disloyal, disgruntled or simply careless employees working inside the organization.

Internal employees, utilizing the permissions that have been granted to them, may gain access to the enterprise's information stored on the organization's computer system, download the information to their user's computer and then transfer the information to a hostile entity via an external storage device or any other method of data transferring. The external storage device may be a removable storage device (e.g. flash memory, such as but not limited to, DISK ON KEY provided by M-SYSTEMS or a other removable hard disk drives), a removable storage media (e.g., floppy disk, write able CD ROM or external hard drives), an internal hard drive (e.g., IDE hard drive or SCSI hard drive), a PDA with storage, a digital camera with storage, etc.

One common approach to deal with this type of security threat is by preventing access to all external storage devices from the computer system. This can be accomplished by blocking all the ports on which such external storage devices can appear on, or blocking the mount operation of a storage device. However, such drastic approaches adversely affect the productivity of the computer system users in that they prevent the employees from using any removable media.

Other common method is using one or more security agents that reside locally on each user's machine. A security agent is adapted to manage and enforce organizational security rules (policy) on its local user's computer. Usually a security agent can be effective when the user's computer is connected to the organizational network as well as when the user's computer is working offline far away from the organizational network. This agent monitors and controls the interaction of the local machine with other machines and devices. An exemplary security agent is disclosed in a PCT application number PCT/IL 2005/001367 and in a PCT application number PCT/IL 2004/001073, the contents of which are incorporated herein by reference. Usually an operating system is configured that the security agent is loaded as one of the first applications after the operating system.

However, there is a risk that a malicious employee, which "owns" the user's device, may try to remove or tamper the security agent in order to override the organizational security policy. An employee that "owns" the user's device has passwords, time and location in which he/she can access the user's device. Such a user may have some administrator's rights over her/his own machine, as well as some knowledge on the security policy. The malicious employee may try to bypass the security agent by installing a bypass, a detour application in both ends of the security agent for transferring the data over the bypass connection. Alternatively, in order to eliminate the operation of the security agent a malicious employee may reconfigure the operating system, by changing, for example, the operating system configuration file such as the Registry in Windows™ (Microsoft) operating system (OS).

A sophisticated malicious employee may use a CDROM having a boot program with an alternative operating system, such as Linux. The computer may be booted via the CDROM and loading the other operating system that does not include the security agent. Then the malicious user may copy the required confidential files or the entire content of the hard disk. Therefore, there is a need in the art for new method that can limit the ability of an employee to affect an installed security agent.

SUMMARY OF THE DISCLOSURE

Exemplary embodiments of the present invention meet at least some of the above-described needs for protecting the integrity and the effectiveness of a security agent that is installed in a user's device while the user's device operates online or offline (connected or not-connected to the organization network, respectively). Usually, the security agent is used for enforcing a security policy that is required by a corporation to which the user's computer belongs. One aspect of exemplary embodiments of the present invention is to associate the content of one or more storage devices of the user's computer with the security agent and with a boot-loader program that is used by the user's computer. A storage device is a read/write persistent storage device such as but not limited to a hard disk drive or non-volatile memory (a flash memory), for example. Henceforth, the description of the present invention may use the term 'hard disk' as a representative term for any read/write persistent storage devices.

A boot-loader, or a bootstrap, program is a sequence of instructions for system initialization. This program is tailor-made to load enough other software from the hard disk for the operating system to start. Often, multiple-stage boot loaders are used, in which several small programs summon each other, until the last of them loads the operating system. Usually one or more of the first programs of the boot-loader process is maintained in "firmware", such as electrically-alterable or hard-coded read-only memory (ROM). The next one or more programs can reside on the hard disk in sectors that are associated to the boot loader process or in a flash memory, for example. Upon power-on or system reset, the boot-loader is executed by the central processing unit (CPU) of the user's device, to load an operating system user code from the hard disk into a system program memory section for execution by the CPU. The boot-loader then passes control to the operating system code.

In an exemplary embodiment of the present invention, the association between the content of the hard disk, the security agent and the boot-loader can be achieved by encrypting the content of the hard disk using an encryption key that is stored in the persistent memory of the boot-loader firmware. After the boot loader process the security agent may be adapted to retrieve the encryption key from the firmware memory and load it into an appropriate location in the system program memory to be used later on by the security agent during read/write cycles to the hard disk.

In an alternate exemplary embodiment of the present invention the boot loader program may be adapted to load the security agent from the hard disk into the operating system memory. In such an embodiment, the boot loader program may be adapted to load the encryption key to the program memory.

In addition to its common operation, the security agent may include an encryption/decryption engine. Furthermore the security agent may be adapted to intercept the data transportation from/to a user application to/from the hard disk. The data transferred to the hard disk can be encrypted and the data transferred from the hard disk can be decrypted by the security agent. The encryption engine can use a public key encryption algorithm or a symmetrical key algorithm. When using a public key algorithm, a block of program code or data is encrypted by the algorithm while using the public key. The encrypted data is decrypted by using a private key. RSA algorithm that is well known in the art can be an example of public key algorithm. When using the public key algorithm, the private key can be stored in the boot-loader firmware and while the public key can be stored in the hard disk with the software of security agent and may be loaded by the boot-loader during power-on as part of the security agent code.

In an alternate exemplary embodiment of the present invention the encryption/decryption engine may use a symmetrical key algorithm such as but not limited to AES, DES, 3DES, RC4 that are well known in the art. In such algorithm a single encryption key is used to encrypt and decrypt the data or program code. In such an exemplary embodiment of the present invention the symmetrical key is stored in the boot-loader firmware.

Furthermore, an exemplary embodiment of the present invention may use virtual machine architecture and uses a mini operating system (MOS) that hosts a common operating system such as Windows™ (a trademark of Microsoft) as a guest operating system (GOS). The MOS can be used as the host operating system and Windows™ as the guest operating system. The MOS may be loaded from the hard disk or from the boot-loader firmware by the boot-loader during power-on or reset and may be stored into system program memory of the user's device in a memory section that is below the memory section of the common operating system. The memory section of the MOS can be transparent to the operating system. The MOS may include drivers to the physical ports of the user's device to its RAM (Random Access Memory) and its hard disk. Therefore the data transportation from a user application via the operating system to and from the RAM, the hard disk, any external device or network can be transferred through the MOS. After initiation the MOS can be adapted to continue the bootstrap process and to load the guest operating system (GOS) from the hard disk into the system program memory section, which can be above the section that is occupied by the MOS.

Furthermore, during loading the operating system and during ongoing operation, the MOS can be adapted to check the integrity of the security agent and/or the integrity of the operating system. An exemplary embodiment of the present invention may manipulate the virtual paging mechanism of the guest operating system and defining the pages of the operating system and/or the security agent code as read only.

If a hostile application tries to write in one of those pages, then a page fault interrupt will occur and invoke the MOS. In case that the MOS suspects that the operating system and/or the security agent have been tampered the MOS may disable the operation of user's device, or destroy the content of the hard disk, etc. An exemplary MOS can be implemented by using commercial virtual machine such as but not limited to products of VMware Inc. California.

Another exemplary MOS can be implemented as a Virtual Machine Monitor (VMM). A virtual machine monitor is a thin piece of software that runs directly on top of the hardware and virtualizes all the resources of the machine. Since the exported interface is the same as the hardware interface of the machine, the operating system cannot determine the presence of the VMM. The VMM technique is well known in the art since 1970. A common VMM may utilize a memory manager unit (MMU) that is associated with the computer. The MMU may translate the virtual memory pages into physical memory addresses. The description of this application will not depict the operation of a common VMM.

On top of the VMM, the MOS may have a software module that follows the current activity of the computer in order to determine whether the current activity can violate the security agent and/or the operating system. Tracing the activity of the computer can be done by placing break-point in selected virtual memory pages that are relevant to the security agent or certain device driver or port driver. Some memory pages can be defined as read only pages. When a hostile code tries to write to one of those pages a page fault interrupt is invoked and the MOS may prevent the writing into the protected pages. By using its monitoring capabilities the MOS keeps the integrity of the security agent and the operating system.

Yet in an alternate exemplary embodiment of the present invention the MOS can be implemented by a common operating system, such as but not limited to Linux. The GOS, for example can be a Windows™ (Microsoft) that can be embedded as a folder in the disk and a process in the memory of the MOS.

Other objects, features, aspects and advantages of the present invention will become apparent upon reading the following detailed description of the embodiments with the accompanying drawings and appended claims.

BRIEF DESCRIPTION OF THE SEVERAL VIEWS OF THE DRAWING

Embodiments of the invention are illustrated by way of example and not limitation in the figures of the accompanying drawings, in which like reference numerals indicate corresponding, analogous or similar elements, and in which:

FIG. 6 illustrates a flowchart with relevant steps of an exemplary method for power-on;

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EXEMPLARY EMBODIMENTS

Turning now to the figures in which like numerals represent like elements throughout the several views, various aspects and exemplary embodiments of the present invention are described. For convenience, only some elements of the same group may be labeled with numerals. The purpose of the drawings is to describe exemplary embodiments of the present invention and not for production or limitation. Therefore, features shown in the figures are chosen for convenience and clarity of presentation only.

Figure 1:
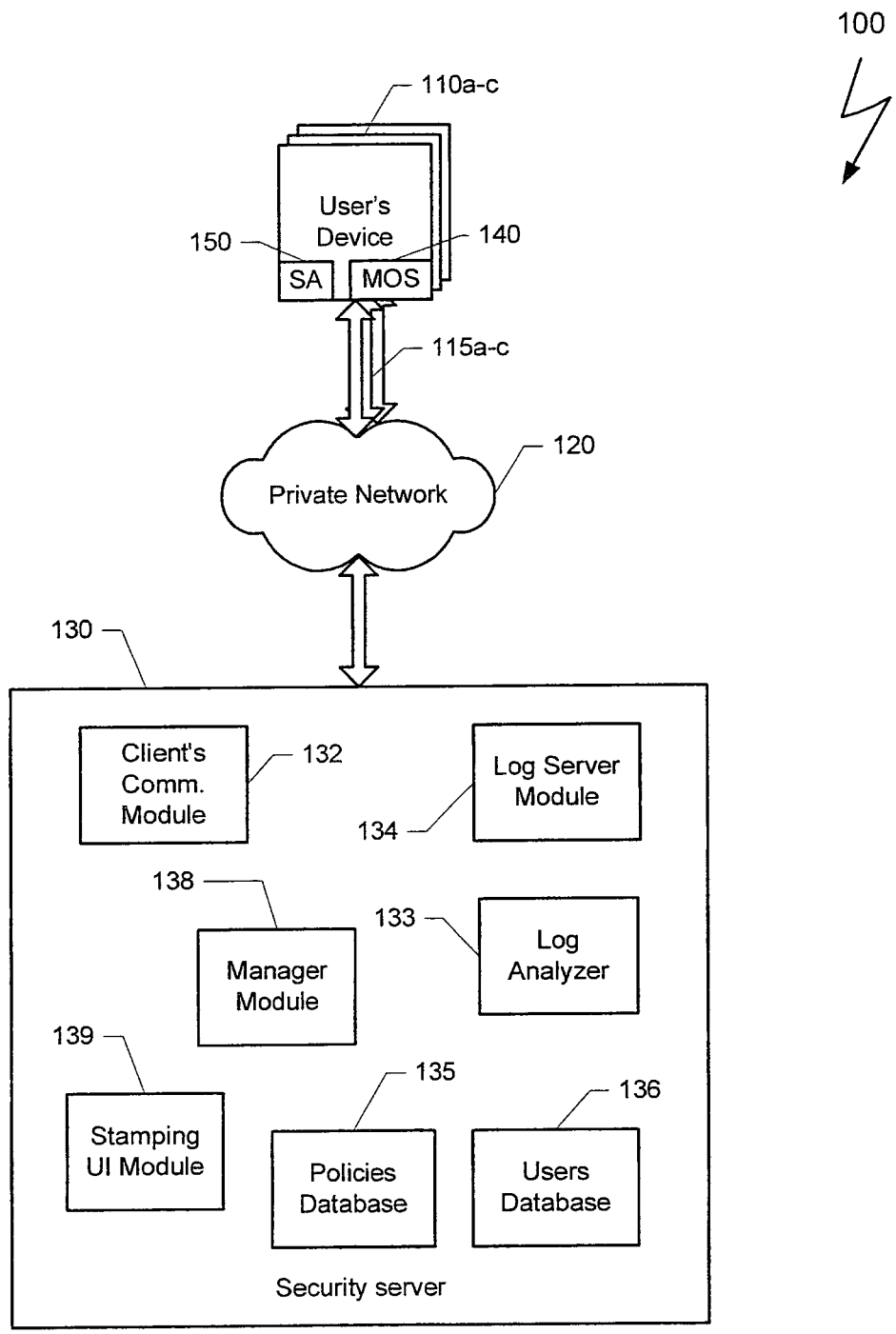
FIG. 1 is a block diagram depicting relevant elements of a computer system that uses an exemplary embodiment of the present invention for protecting the computer system.

FIG. 1 is a block diagram depicting relevant elements of a computer system 100 that uses an exemplary embodiment of the present invention for forcing security policy of an organizational network as well as forcing the security policy on the user's devices. The computer system 100 may consist of a plurality of user's devices 110a-c. a private or public network 120, a plurality of communication channels 115a-c between the private network 120 and the plurality of user's devices 110a-c. and a security server 130. Three instances of user's devices 110a-c and communication channels 115a-c are shown in FIG. 1 by way of example only, and it will be appreciated that any number other than three may also be used with various embodiments of the present invention. The private network 120 may be an Intranet, cellular network, a LAN, a VPN (Virtual Private Network) or any other type of communication network. Exemplary embodiments of the present invention can be implemented in a public network as well as in a private network.

Each of the user's devices 110a-c may be a personal computer, a workstation, a desktop computer, mainframe computer, blade server (e.g. CITRIX), dumb terminal, etc. or any other type of computing device that can be connected over the private network 120. In addition each of the user's devices 110a-c may also be a portable device, such as but not limited to a laptop computer, notebook computer, a smart phone, a personal digital assistant (PDA), or any other type of mobile device. In this application, the terms "user's device" and "user's computer" may be used interchangeably.

From time to time, the user's device 110a-c may be connected to various networks, at home, at work, and at other locations. Communication channels 115a-c may be permanent connections, temporary connections, and wire or wireless connections. A wireless connection can be an RF connection based on a protocol such as, but not limited to, Bluetooth, GPRS, UMTS or WiFi. The wireless connection may also be an Infra Red (IR) connection.

An exemplary user's device 110a-c may be implemented as a virtual machine having a mini operating system (MOS) 140 that hosts a common operating system such as Windows OS as a guest operating system (GOS). In addition the user's device 110a-c includes a security agent 130. The security agent is used for enforcing the security policy of the organization on the computer while the computer is working on-line or off-line. MOS 140 can be adapted to verify the integrity of the GOS as well as the integrity of the security agent 140. More information about the user's device 110a-c is depicted below.

The security server 130 may be an element of network 120. The security server 130 may be responsible for managing the one or more security policies that are used over the private network 120. A plurality of policies may be used by each user's device 110a-c. The security policies may be based on the user's degree of security, the type of the devices that are connected to the user's computer, etc. The security policies can be updated from time to time and then be loaded or reloaded into the user's devices 110a-c.

The security server 130 can operate to ensure that all user's computers comply with specified security policies. For example, if a trigger event occurs and a copy of a corporate security policy is not available on a user's device 110a-c. the user's computer 110a-c may initiate a connection to the security server 130. In response to such initiation, the appropriate policies may be downloaded to the user's device 110a-c. The security server 130 may periodically update the security policies that are installed in each one of the user's devices 110a-c. The security agent 150 within the user's device 110a-c. among other things, operates to enforce the security policy by monitoring events in accordance with the security policy and preventing types of activities according to organizational policies.

The security server 130 can be constructed in a variety of manners. One exemplary embodiment of the present invention may comprise the following relevant modules: client's communication module 132, log analyzer module 133, log server module 134, policies database 135, client database 136, stamping user interface module 139 and a manager module 138. Client communication module 132 is typically used to communicate with the plurality of user's devices 110a-c over the private network 120 while the user's devices 110a-c are connected to the private network 120. The communication between the user's devices 110a-c and the security server 130 can be encrypted to create a secure connection between the user's devices 110a-c and the security server 130, over which data can be sent securely.

The communication from the security server 130 to the user's device 110 may include: providing updated security policies, and/or periodically checking the security agent 150, and/or the security policies that have been installed on the user's device 110, and/or periodically checking the MOS 140 to determine if they have been contaminated or have been tampered with by any hostile code. Security server 130 may communicate with the MOS 140 for collecting information on trials to affect the code of the security agent and/or the operating system. If a particular user's device 110 does not have a required security agent 150 or security policy installed, or the security agent 150 and/or the MOS 140 were infected, the security server 130 can prevent further access to the private network until such user's device 110 has installed and activated the required security agent, MOS or security policy. Technologies like network access control (NAC) of Cisco, Network Access Protection (NAP) of Microsoft, or changing routing tables can be used in order to prevent connection of an infected security agent to network 120.

The communication from the user's device 110 a-c to the security server 130 may include: (a) a real-time indication that is used to inform the security server 130 when the user's device 110 a-c is connected to the private network 120, (b) reports on events according to the security policy, (c) reports on trials to affect the host operating system and/or the security agent or the stored security policy, etc. The report may include information on any connection of the user's computer 110 to an external device, information on the data transfer, the timing of the event, the location, the device to which the data transfer was done, shadowing of the information that was transferred while the user's device 110a-c was not connected or connected to network 120, etc.

The log server module 134 may be or may include a storage device. Any reports that have been sent from the user's computers within a certain period of time and/or pertaining to any policy violation event can be received by the log server module 134 and stored within the storage device. The reports may be retrieved and processed manually by an administrator of the private network 120 or automatically by the log analyzer module 133, which may run several statistical algorithms in order to monitor the security of the network. The process may uncover a careless user that may have connected or attempted to connect certain devices to the user's computer 110 or identify an attempt to access such certain storage devices or identify an attempt to tamper the security agent 150 and/or the GOS. The report may also identify a negative trend. As one example of a negative trend, the report may identify multiple user's computers in which the security agent has been tampered with, modified, etc. When a portable user's device is not connected to the network 120, the events may be kept by the client agent operating within the user's computer and then sent to the security server 130 when the user's computer is reconnected to the private network 120.

Policies database 135 may include a database of a plurality of policies, including security policies that may be used by the organization that uses the private network 120. A security policy may include a set of rules that are used to determine whether a given user's computer can be permitted to gain access to a specific storage device. The security policy may depend on a variety of factors, such as but not limited to, the size of the storage device, the manufacturer of the storage device, whether the device is "stamped", "stamp" security ascriptions, etc. In addition, different security policies may be allocated to different users, groups of users, computers working hours, etc.

Users Database 136 is a database that may include information regarding the various user's devices 110a-c that may be connected over private network 120. This information may include items such as but not limited to: the user's level of security, the type of equipment that the user possesses, the external devices to which the user's computer is allowed to be connected, information about the different environments in which the user's computer may work, a rescue key that can be use in order to rescue the content of a persistence storage device in case that the a boot-loader firmware, the security agent or the MOS that are used by the user's computer have been damaged.

The manager module (MM) 138 manages the operation of the security server 130. It may initiate tasks to check the status and configuration of each one of the security agents 150, MOS 140 and the security policies installed within the various user's computers. In alternate exemplary embodiment of the present invention MM 138 can be adapted to communicate with the MOS 140 in order to verify the integrity of the GOS. The MM 138 may create and send the appropriate policies to each one of the user's computers. Based on the information that is stored in the policies database 135 and the client database 136, the MM 138 may create one or more policies for a particular user device 110 a-c. For example, a user that has a portable computer may need three policies. One of the policies may be used while the particular user's computer is connected to the private network 120. Another policy may be used when the user's computer is operating in a known environment, such as but not limited to a home environment or home network. The third policy may be used when the user's computer is operating in an unknown environment or location. One example of such an unknown environment or location would include a hotspot or a WiFi access zone.

The MM 138 and the stamping UI module 139 cooperatively may be used for signing a "stamp" on each one of the boot-loader firmware and or each one of the security agent 150. An exemplary method for signing the "stamp" or a digital certificate may be based on a certification standard, including but not limited to ITU.T standard X.509. Signing may be done by using cryptographic techniques such as but not limited to MD5. SHA-1 for calculating a hash value and RSA for encryption and decryption. In an exemplary embodiment of the present invention, the security server has a cryptographic private key, while each of the user's devices has a public key. This public key can be stored in the boot-loader firmware of the user's device 110 a-c. The ITU is the United Nations Specialized Agency in the field of telecommunications. The ITU Telecommunication Standardization Sector (ITU-T) is a permanent organ within the ITU. The ITU-T is responsible for studying technical, operating and tariff questions and issuing recommendations on them with a view to standardizing telecommunications on a worldwide basis. Additional information regarding the ITU can be found at the website address of www.itu.int.

The stamping user interface module (SUIM) 139 may have a graphical user interface (GUI) that may be used by the administrator of the system to "stamp" an external device and/or the boot-loader firmware. In an alternate exemplary embodiment of the present invention SUIM 139 may be distributed over one or more computers that are used by one or more administrators for interfacing with the security server. The SUIM 139 may gather parameters from the storage device, and allow the administrator to choose a security ascription, to which a user's device will be associated, size of the security agent, etc. The parameters and the ascription are used in the process of creating the new stamp. This information is transferred to the MM 138. The MM 138 may retrieve the parameters and the ascription of the "stamp" to be written on the boot-loader firmware of the user's device. The "stamp" can be processed and then written onto the boot-loader firmware.

Figure 2:
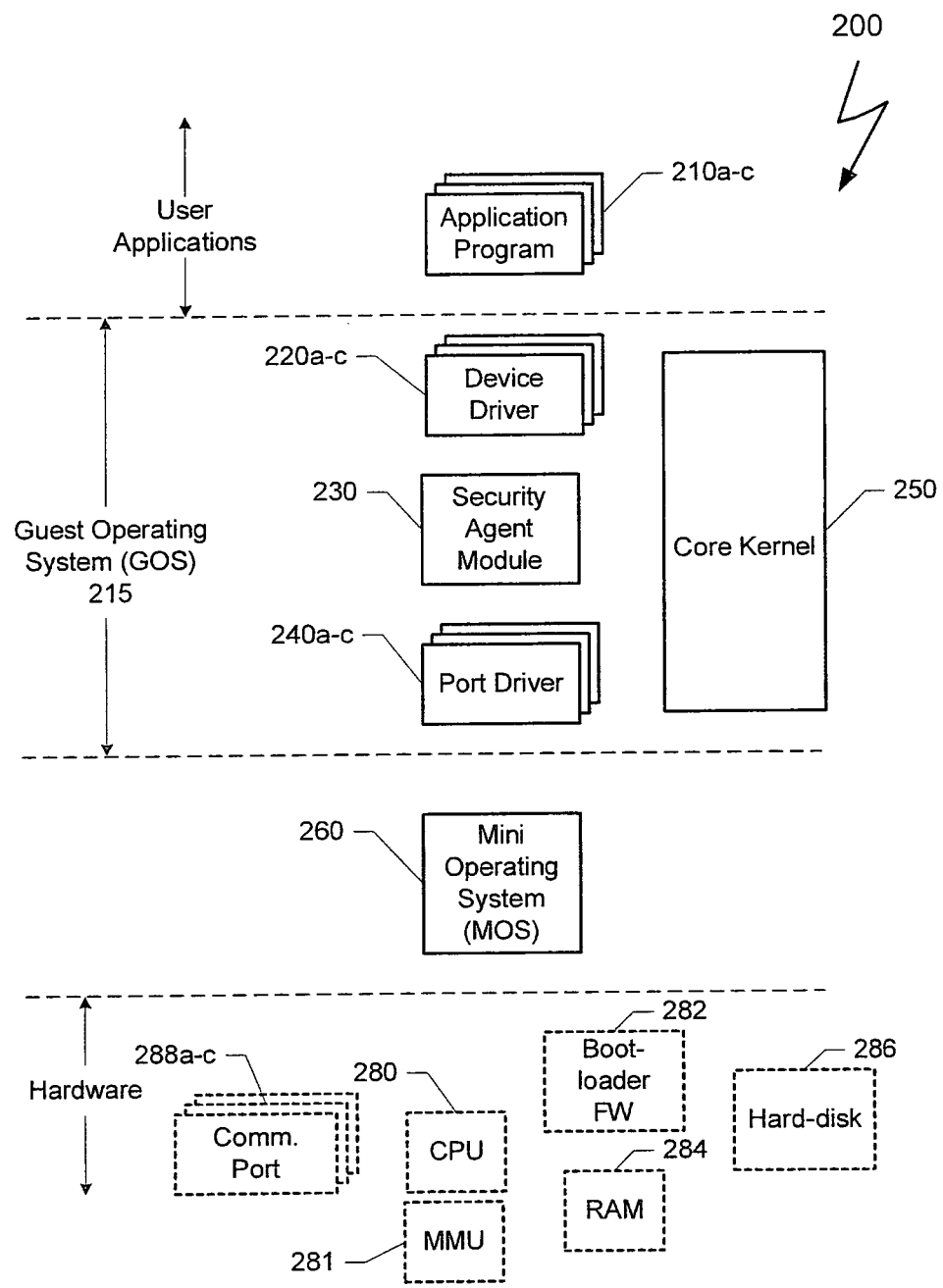
FIG. 2 is a block diagram depicting relevant elements of a system that may be used in an exemplary user's computer.

FIG. 2 is a block diagram depicting relevant elements of an exemplary user's computer 200. The user's computer 200 can be divided into four levels: a user applications level, a guest operating system (GOS) 215, a mini operating system (MOS) and the hardware level. The user application level comprises one or more application programs 210a-c. The application level operates via the GOS 215. An exemplary guest operating system level can be implemented by a common operating system such as but not limited to Microsoft Windows (a trademark of Microsoft), Unix, MAC OS, VMS; LINUX, SYMBIAN, PALM-OS, Windows CE etc. The GOS 215 can comprise one or more device drivers 220a-c. one or more communication port or bus drivers (stack) 240a-c. a core kernel module 250. In addition an exemplary GOS 215 may comprise a security agent module 230. In an exemplary embodiment of the present invention the GOS 215 can be isolated from the hardware level of the computer system 200 by MOS 260. Yet in an alternate embodiment of the present invention the GOS 215 may not be isolated from the hardware level but may be monitored and controlled by the MOS 260.

The MOS 260 can be a code added to computer system 200 in order to validate the pureness and the operation of Security Agent (SA) 230 while the computer system 200 is running. MOS 260 may verify that the SA 230 was not bypassed by another code, and/or that the SA 230 has not been modified to skip or ignore some limiting policies, and/or that the encrypting/decrypting engine (if exist) has been disabled. Disabling the encrypting/decrypting engine may enable copying data from the network 100 (FIG. 1) to the hard disk 286 of computer system 200 to be latter transferred to an hostile entity, etc.

An exemplary MOS 260 can run on top of the hardware and virtualizes some or all the resources of the computer system 200. The operation of MOS 260 is transparent to GOS 215. GOS 215 cannot determine the presence of MOS 260. An exemplary MOS 260 can be implemented by using a virtual machine monitor (VMM) technique that is well known in the art. In addition to typical VMM software modules the MOS 260 may comprise one or more logical modules that are adapted to verify that the SA 230 has not been tampered and that it operates properly. Furthermore, the MOS may control the operation of the computer 200 based on decisions relevant to the operation of the SA 230.

An alternate exemplary embodiment of the present invention, which can be used in a user's computer that has a virtual memory pages system, the MOS 260 may be implemented by a transparent software module that traces the physical pages of the program memory addresses. The MOS 260 may include an Addressing Inspection Module (AIM) and a Physical to Virtual Translating Module (PtVTM). The AIM may use tracing technique such as breakpoint technique and/or page-fault interrupt as identification for attempting to violate the security agent or the MOS itself. Traces can be placed in sensitive addressing spaces of the program memory 284. When a code requests an access to a traced (marked) physical memory page, then MOS 260 can be invoked. Determining the location for placing the traces can be done after the termination of the boot-loader process. The location of the SA 230 in RAM 284 can be verified by utilizing features of the GOS. In an exemplary embodiment of the present invention in which the GOS 215 is Windows and the SA 230 is implemented in a way that includes a kernel driver, then the "Driver Object Structure" can be checked for the relevant pages by using DriverStart and DriverSize values in the driver's device object. These values determine the memory pages where the SA 230 driver is found.

Yet an alternate exemplary embodiment of the present invention MOS 260 may be implemented by a debugger application that is modified to be transparent and automatic. The debugger technique is well known in the art. The MOS may be adapted to use breakpoint to determine when an execution should be interrupted. A breakpoint can indicate reading, writing, modification of a specific area in RAM 284, or at a particular time (non-working hours, for example). The interrupt may invoke additional software modules that automatically analyzes the situation, may proceed by running code step by step and reach a decision whether the operation is legal or not. Based on this decision the GOS 215 may be enabled to continue or disabled. MOS 260 may initiate counter measures methods to prevent the violation.

Yet in an alternate exemplary embodiment of the present invention, MOS 260 can be implemented by a commercial operating system, such as but not limited to Linux, Windows CE, etc. In such an embodiment the GOS 215 can be embedded as a process/application of the MOS 260. During the boot-loader process the MOS is loaded and initiated first from the hard-disk 286 to RAM 284. Then the MOS 260 loads the GOS 215 from the hard-disk to the RAM. The additional functionalities of MOS 260 that are relevant to the communication with the security server 130 (FIG. 1) and to checking the integrity of the SA 230 and/or the GOS can be implemented as another one or more applications/processes of MOS 260. The application/process of MOS 260 that runs the GOS 215 may also include methods that simulate the hardware of system 200 for virtualization of the hardware of system 200. More information on the operation of MOS 260 is disclosed below in conjunction with FIG. 4, FIG. 6 and FIG. 8.

Among other hardware modules, the hardware level can comprise a CPU 280, a Boot-loader firmware 282, a random access memory (RAM) 284, a hard disk 286, and one or more physical communication ports or buses 288a-c. CPU 280 can be a processor that is capable of using virtual paging memory system, for example Intel-x86 compatible processors, Motorola 68030. etc.

Boot-loader firmware 282 can be an electrically-alterable or hard-coded read-only memory (ROM) that stores a boot-loader program, The exemplary Boot-loader firmware 282 can be modified, by the administrator of network 100 (FIG. 1), to load the code of the MOS 260 from the hard-disk to the appropriate location in RAM 284. The location of the MOS 260 can be in memory addressing section (memory addressing space 520, FIG. 5) adjacent and above the memory addressing section of the Boot-loader program (memory addressing space 510, FIG. 5).

The boot-loader program can be adapted to verify the validity of the loaded MOS 260. Checking the validity of the MOS 260 can be done by using cryptographic technique such as but not limited to MD5. SHA-1 for calculating a hash value for each block of MOS 260 code that is loaded. The signing of the MOS 260 can be done by the administrator of system 100 via security server 130 (FIG. 1). The boot-loader program may use a private key that can be stored in the firmware 282 by the security server prior to the installation of the firmware 282 in the user's computer 200.

After authenticating the MOS 260, the CPU 280 may proceed according to the boot-loader program and may load the GOS 215 with its drivers and the security agent 230. The boot-loader firmware may be adapted to include a validation process for the security agent 230 using a similar method to the one that is depicted above in conjunction with loading of MOS 260. In an exemplary embodiment of the present invention in which the content of the hard disk is encrypted/decrypted by the security agent. During the boot-loader process an encryption key, which is stored in the firmware 282, is transferred to the security agent 230. The encryption key may be stored in the boot-loader firmware 282 by the administrator of system 100 using the security server 130 (FIG. 1). At the end of the boot-loader program the instruction pointer of CPU 280 is set to the first address of the MOS 260 to initiate it.

In an alternate exemplary embodiment of the present invention the firmware 282 may include a small program that loads portion of the MOS 260 from the hard disk 286 to RAM 284. This portion of MOS 260 is sufficient for continue loading the MOS 260 from the hard disk. MOS 260 is adapted to load GOS 215 with the SA 230 and to validate the integrity of the loaded SA 230. In such an embodiment of the present invention the boot-loader firmware 282 may get one or more verification parameters such as but not limited to encryption/decryption keys that are used by the security agent 230. Loading the verification parameters into the firmware can be done by the security server 130 (FIG. 1) More information on the boot-loader program is depicted below in conjunction with FIG. 6.

Figure 5:
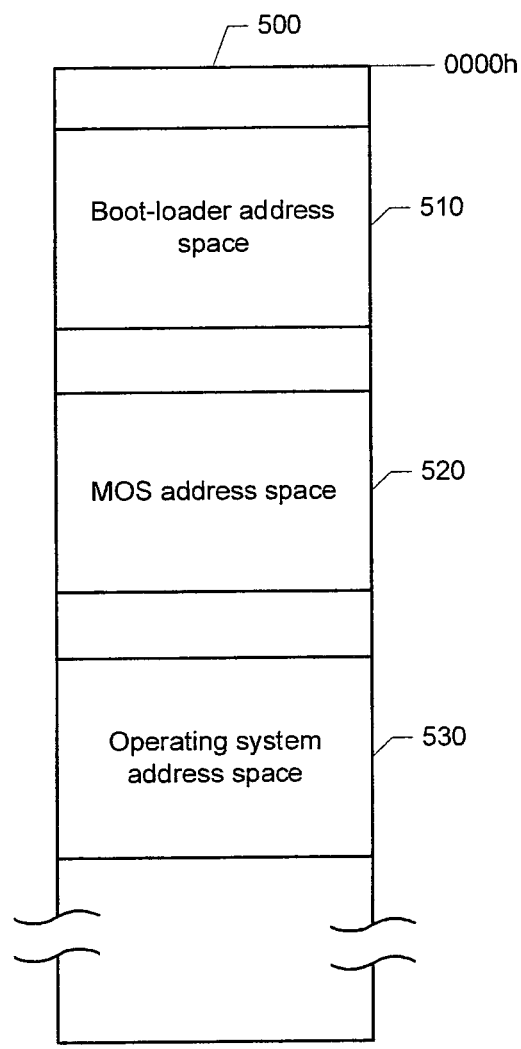
FIG. 5 is a memory map diagram illustrating the mapping of a system program memory space according to an exemplary embodiment of the present invention.

RAM 284 is a random access read/write memory. An exemplary RAM 284 may be divided into pages of address. A page is a minimum portion of the memory that can be allocated to an entity. RAM 284 can be used to store the software program that is executed by computer system 200 as well as data and parameters that are currently used. An exemplary physical memory addressing map 500 of CPU 280 is illustrated in FIG. 5. The mapping includes the memory space of the boot-loader firmware 282 and RAM 284. It can be seen that the storage of the boot-loader firmware is using the first space of addresses 510, contiguous and above it is the addresses space 520 that is allocated to MOS 260, contiguous and above is the addresses space 530 of GOS 215 which includes also the address space of the security agent 230 (not shown in the map). The address space 520 and 530 can be part of RAM 284. The rest of RAM 284 can be used for data.

In some exemplary embodiment of the present invention RAM 284 can be managed by a memory management unit (MMU) 281. The MMU 281 can be a class of computer hardware components responsible for handling memory accesses requested by the CPU 280. Some CPUs 280 may comprise the MMU 281. Common functions of an MMU 281 are the translation of virtual addresses to physical addresses (i.e., virtual memory management), memory protection, cache control, bus arbitration. The MMU 281 normally translates virtual page numbers to physical page numbers via an associative cache called a TLB. The MMU may be used by MOS 260 in order to trace the operation of the GOS 215.

Hard disk 286 can be a read/write persistent storage device such as but not limited to a hard-disk drive or non-volatile memory (a flash memory) that stores data and software program that are used by the computer system 200.

Generally, data transportation in the user's computer 200 can flow from/to an application program 210*a-c* to/from a physical communication port 288*a-c* or RAM 284 or hard disk 286 via the appropriate device driver 220*a-c*. security agent 230, core kernel 250, the appropriate port driver 240*a-c*. In some embodiments the data can be transferred also via the MOS 260.

The example illustrated in FIG. 2 shows the use of three application programs 210*a-c*, three device drivers 220*a-c*. three port drivers 240*a-c*. and three physical communication ports 288*a-c*; however, it will be appreciated that any number other than three may be used with the present invention. The software of user's computer 200, or aspects of the client software, may be stored in a fixed storage medium (e.g. a disk, flash memory, a read-only memory (ROM) etc.).

During operation one or more application programs 210*a-c* may be transferred from a fixed storage medium into a RAM 284 of client 200 for execution by the GOS 215. The application programs 210*a-c* may be a program such as, but not limited to, (a) synchronization applications for a PDA, (b) Java applications for synchronization with external Java devices, such as but not limited to cellular telephones, backup storage applications, (c) office applications, including but not limited to word processing applications, presentation applications, file utilities, etc., and (d) communication applications, such as but not limited to, applications that utilize Bluetooth or WiFi protocols, Internet browser, etc.

When the core kernel 250 and/or one or more application programs 210*a-c* operate to communicate with a device, the appropriate device driver 220*a-c* may be invoked. The device driver 220*a-e* is used as an intermediary node between the core kernel 250 and/or one or more application programs 210*a-c* and the device itself. Exemplary devices can include external devices such as but not limited to a removable storage device, a printer, a PDA, a WiFi dongle, etc; or internal devices such as but not limited to the internal hard disk 286, RAM 284, etc. An exemplary embodiment of the present invention may associate the content of the hard disk 286 with the boot-loader firmware 282 and the security agent 230. The association is needed for preventing a disloyal owner of the computer system 200 to bypass the security agent and copy the content of the hard disk.

Usually a device driver 220*a-c* is supplied by the vendor of the device itself. In addition to the device driver 220*a-c*. a port driver 240*a-c* may also be invoked. The port driver/bus driver 240*a-c* is used to organize the communication according to the protocol that is used over the physical communication port 250*a-c*. For example, if communication port 250 is a USB port, then a USB driver (USB stack) is needed. The above-described computer software is for illustrating the basic software components that may be employed by a user's device 110*a-c* (FIG. 1). In addition to those elements, a security agent 230 is added by an exemplary embodiment of the present invention.

The security agent 230 may be stored in hard disk 286 and be loaded to RAM 284 during the power-on cycle of the user's computer 200. The SA 230 can be validated by the MOS 260 or the boot-loader program and remain active for the entire operation of the system 200. In other embodiments of the present invention, the security agent 230 may be burned onto a physical memory, such as the ROM, PROM, BIOS (the boot-loader firmware 282), etc. The security agent 230 may be installed as a section of the GOS 215 and can be handled by an administrator having the appropriate permissions. The security agent 230 may be installed above the one or more communication port/bus drivers 240*a-c*.

In an alternate exemplary embodiment of the present invention the SA 230 can be a section of MOS 260 or an application that is executed in the MOS. In such an embodiment of the present invention, during the bootstrap process SA 230 is loaded from the hard-disk (HD) 286 by the MOS and is stored in program memory section 520 (FIG. 5) of RAM 284. This memory section 520 is transparent to GOS 215 and therefore it is not vulnerable to attacks that occur on the level of GOS 215.

An exemplary security agent 230 may emulate a kernel device driver and will receive the communication between the device driver 220*a-c* and the appropriate port driver 240*a-c*. During the installation and/or periodically, from time to time, the security agent 230 may register in the appropriate location in the core kernel as the first device driver for receiving the communication from/to the different physical communication port/bus drivers. For example, if GOS 215 is a Microsoft product, than the security agent 230 may register in the Registry as the first device driver to get the communication. The registration may be done in a class level or in a device level. Exemplary classes may be USB, CD-ROM drivers, Disk Controller, etc.

In some operating systems, the device driver may be constructed from a stack of two or more sub-device-drivers. In such architecture, an exemplary embodiment of the security agent 230 may operate to collect information from at least one of the two or more sub-device-drivers. For example, in the scenario of using a USB flash storage device, such as but not limited to, DISKONKEY (DiskOnKey is a trademark of M Systems) in the WINDOWS (Windows is a trademark of Microsoft) environment, the stack of the relevant sub-device-drivers can include: VolSnap.sys; Disk.sys; UsbStor.sys; and Usbhub.sys. The security agent may collect information from any of the four sub-device-drivers.

In an exemplary embodiment of the present invention, the security agent 230 may emulate a filter procedure but, instead of providing the functionality of a common storage filter driver, the security agent performs security checking. A filter may perform device-specific functionality that is not provided by a class device driver. The security agent 230 may emulate more than one type of filter driver. The number of types of filters that may be emulated by the security agent 230 can be configured according to the number of physical communication ports and devices of which their transportation may be checked by the security agent 230.

Security agent 230 may be activated when a physical communication port is requested. The security agent 230 may pull the transportation to and from the physical communication port, processes the information and may reach a decision regarding the legality of the requested connection and/or data transfer. An exemplary embodiment of the security agent 230 may act as a proxy for both sides. The security agent 230 may be transparent to the user; it may not have any icon or indication to indicate its existence to the user. More information about the operation of security agent 230 is depicted in PCT application number PCT/IL 2005/001367 and in a PCT application number PCT/IL 2004/001073. the contents of which are incorporated herein by reference.

In addition to the above functionality of the security agent 230 as the executer of the security policies of the organization in the user's computer 200, the security agent 230 may include cryptographic engine for associating the data that is written to the hard disk 286 with the SA 230 and with the boot-loader firmware 282. The cryptographic engine may use an encryption key that is stored in the boot-loader firmware 282 and is loaded to the program memory section of the security agent 230 in RAM 284 during power-on or reset. The combination of the encrypted data of the hard disk, the cryptographic engine in the security agent and keeping the encryption key in the firmware 282 bonds the three entities into an association that is mandatory for understanding the content of the hard-disk.

Figure 3:
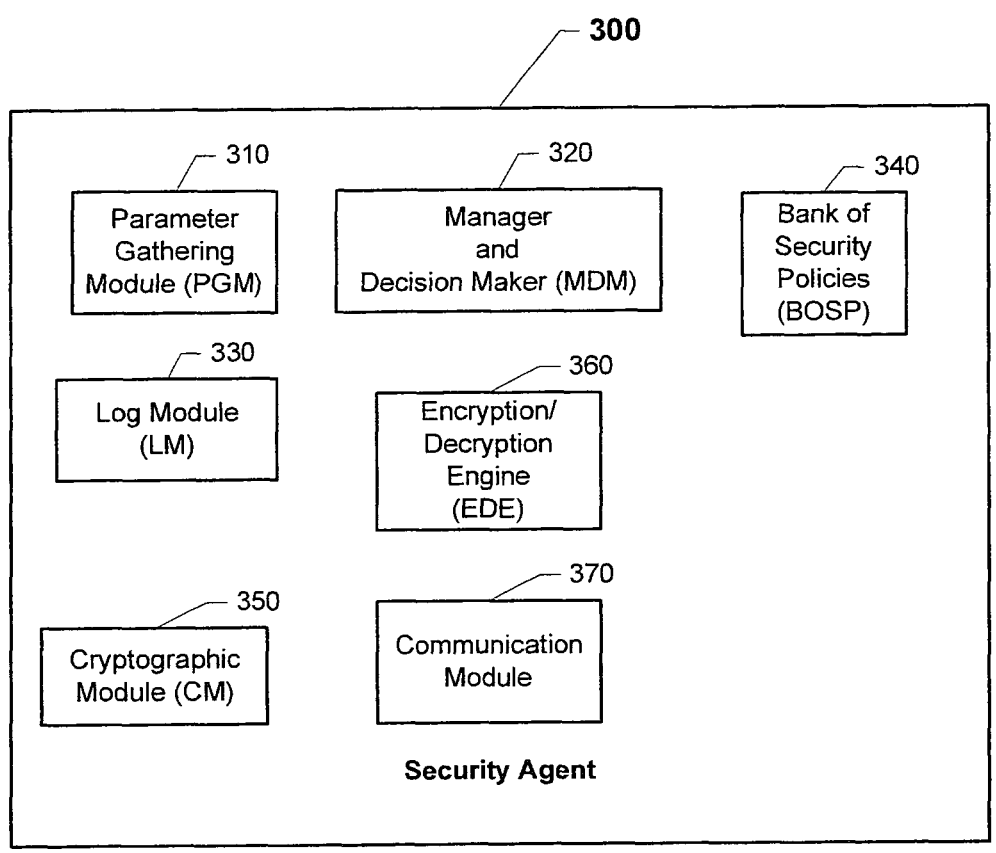
FIG. 3 is a block diagram illustrating components of a security agent according to an exemplary embodiment of the present invention.

FIG. 3 is a block diagram depicting relevant elements of an exemplary security agent (SA) module 300 that may be used by an exemplary security agent 230 (FIG. 2). Exemplary security agent 300 is adapted to verify that data transportation to/from the user's computer 110 (FIG. 1) from/to storage device complies with the security policy of the organization. Other type of security agent may be adapted to verify other type of operation of the computer device. In addition to its security activity, the SA 300 is configured to include a mechanism that bonds the SA 300 with the content of the hard disk 286 (FIG. 2) and the boot-loader firmware 282 (FIG. 2) of the same computer. Security agent module 300 may comprise a parameter gathering module (PGM) 310, a manager and decision maker (MDM) 320, a log module (LM) 330, a bank of security policies (BOSP) 340, a cryptographic module (CM) 350, an encryption/decryption engine (EDE) 360 and a communication module 370.

The PGM 310 detects a newly connected device, such as a storage device. The parameters can include information that is relevant to the device. For example if the device is a disk, the parameters may include, for example: the disk's size, its geometry parameters (such as number of cylinders, tracks per cylinder, etc.), a serial number if one exists, etc. Those parameters can be used during the process of creating and writing the stamp, as well as for verifying stamps. Moreover, the parameters may be used in order to check whether the connection to the device is allowed according to a relevant security policy that is currently in used. For example, if allowing the device depends on its volume of storage, the device may not be allowed unless it falls within the threshold requirements.

There are cases in which parameters of the storage device are not accessible to the security server. In those storage devices, exemplary embodiments of the present invention may use only the information that was written by the security server onto the external storage device.

Another role of the PGM 310 is to retrieve the content of a "stamps" from the storage device (if exist). These stamps are examined with an algorithm that is described below in conjunction with the description of the cryptographic module 350. During this examination, the "stamp" is revealed and checked for authenticity. The parameters of the stamp, which can include the stamp name and ID, are then moved to the manager and decision maker 320. The manager and decision maker 320 then operates to check the applicable policy according to all of the information given by or pertaining to the storage device, such as but not limited to, a USB vendor id, product id, disk size, stamp name (security ascription), stamp ID as well as other parameters and values for determining to permit or deny data transportation to/from the storage device.

The cryptographic module (CM) 350 may be invoked by the MDM 320 upon connecting the system 200 (FIG. 2) to a device that includes storage capabilities. The cryptographic module 350 may get, via the PGM 310, the parameters of the device as well as the current "stamp" that is written on or associated with the device. The CM 350 may verify the validity of the stamp and then update the MDM 320 with the result of the verification. In addition, the CM 350 may update the "stamp". The updated "stamp" is written back to the device replacing the previous stamp.

The log module 330 may be a storage area for storing communication events and/or any policy violation event that have been detected by the SA 300. In addition the log module 330 can keep track of the "stamped" devices (devices with digital certificates) used in or connected to the user's computer 110. When the user's computer 110 is connected to the network 120, the logged events may be sent to the security server 130 (FIG. 1).

The communication module 370 operates to deliver logs from the user's computer 110 to the security server 130, and one or more policies from the security server 130 to the user's computer 110. This communication is preferably secured and includes authentication, so that it will be difficult for a system to mimic a policy. The communication can be based on Internet Protocol, for example.

The BOSP 340 manages one or more security policies that are installed from time to time by the administrator of the private network 120 (FIG. 1), while the user's computer 110 is connected over the private network 120. Moreover, the policy may be dependent upon the time of operation, the type of network, capabilities and types of external storage devices, the number of external devices, etc.

Each security policy may comprise a plurality of rules that may operate to control the behavior or availability of a storage device based on various parameters. The parameters may include, but are not limited to, the device's parameters, hardware parameters, the stamp name and the stamp ID. The rules within the security policy can be positive (i.e. allowances) or negative (i.e. restrictions). An exemplary rule that could exist in a security policy is as follows: a storage device that is stamped with a stamp name="PR", can be used accessed by a user's computer named PR1 only if the stamp ID of the storage device is not one of the following ID numbers (1563 or 2317).

From time to time, the content of the BOSP 340 may be checked and updated manually by the administrator of network 120 or automatically by the security server 130 (FIG. 1). From time to time, the MDM 320 may perform an integrity check on the BOSP 340 to determine if it has been tampered with or modified by hostile code. If the BOSP 340 has been damaged or otherwise altered, the MDM 320 may prevent any data transportation to/from any external device. More information on the operation of the security agent 300 can be found in PCT application PCT/IL 2005/001367 the contents of which is incorporated herein by reference.

In addition to the above mentioned modules, SA 300 can comprise the EDE 360. The EDE is activated each time an application 210a-c (FIG. 2) is willing to read or write to the hard disk 286 (FIG. 2). The data to the hard disk can be encrypted and the data from the hard disk can be decrypted by EDE 360. EDE 360 can use a public key encryption algorithm or a symmetrical key algorithm. When using a public key algorithm, a block of program code or data is encrypted by the algorithm that uses a public key. The encrypted data is decrypted by using a private key. RSA algorithm that is well known in the art can be an example of public key algorithm. When using the public key algorithm, the private key can be stored in the boot-loader firmware 282 (FIG. 2) and may be retrieved by the boot-loader during power-on or reset and be stored in the RAM 284 (FIG. 2), while the public key can be stored in the hard disk 286 with the software of security agent 300 and may be loaded by the boot-loader during power-on as part of the security agent code. Alternatively, the SA 300 may be adapted, upon initiation, to load the private key from the boot-loader firmware and store it in the RAM 284 (FIG. 2).

In an alternate exemplary embodiment of the present invention the EDE 360 may use a symmetrical key algorithm such as but not limited to AES, DES, 3DES, RC4 that are well known in the art. In this algorithm a single encryption key is used to encrypt and decrypt the data or program code. In such an exemplary embodiment of the present invention the symmetrical key is stored in the boot-loader firmware 282.

Yet another exemplary embodiment of SA (not shown in the drawings) may not have an EDE. In such a case the boot-loader firmware 282 with the MOS 260 (FIG. 2) may force the necessity of the SA 230 for the operation of computer system 300. However a disloyal employee, in order to read the content of the hard disk 286 may remove the harddisk 286 from the user's computer and connect it to an unsecured computer. The previous exemplary embodiments with the EDE 360 deliver a tighter protection than the one without an EDE, but may affect the read/write speed to the hard disk.

There are other exemplary embodiments in which the decision, on the whether to use or not to use the EDE 360 while writing to the hard disk, can be depended on the type or the file as well as the owner of the computer device. This decision can be made by the MDM 320 according to an appropriate policy from the BOSP 340.

In an alternate exemplary embodiment of the present invention the EDE 360 can encrypt/decrypt the directory of the hard disk 286. Yet in an alternate exemplary embodiment of the present invention SA 300 can be implemented as a module in the GOS 210.

Figure 4:
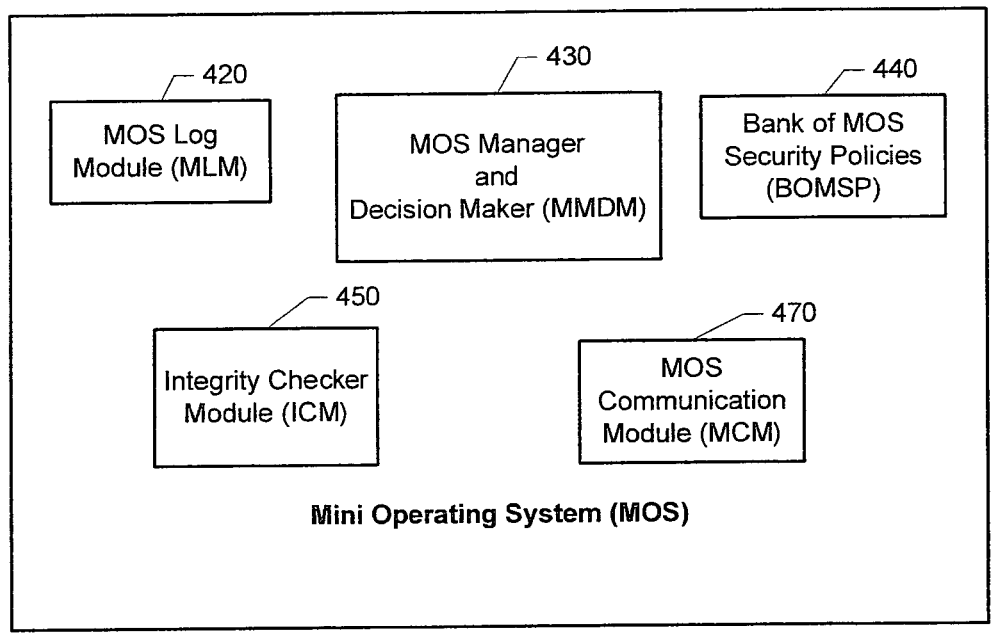
FIG. 4 is a block diagram illustrating components of a mini operating system (MOS) according to an exemplary embodiment of the present invention.

FIG. 4 is a block diagram depicting relevant elements of an exemplary mini operating system (MOS) module 400 that can be implemented in computer system 200 (FIG. 2). Exemplary MOS 400 is adapted to verify that the SA 230 and/or GOS 215 (FIG. 2) have not been contaminated during ongoing operation of the computer system 200. The operation of MOS 400 can be transparent to the GOS 215 as well as to the user of the computer system 200. During power-on or reset MOS 400 can be loaded by the boot-loader program, which is stored in firmware 282 (FIG. 2). MOS 400 can be stored in addressing space 520 (FIG. 5) above the memory space 510 of the bootloader program and below the memory space 530, which is used by the GOS. After initiation by the boot-loader program MOS 400 can continue the bootstrap process and load the GOS 215 (FIG. 2) from the hard-disk 286 and store it in memory section 530.

Exemplary MOS 400 operates to protect addressing space 530 in which the GOS 215 is stored or at least to protect a portion of this memory space of addresses, which is used by SA 230. In order to do so MOS 400 may communicate with MMU 281 (FIG. 2), set traces, uses single step mode, etc. MOS 400 may comprise a MOS log module (MLM) 420, a MOS manager and decision maker (MMDM) 430, a bank of MOS security policies (BOMSP) 440, an integrity checker module (ICM) 450 and a MOS communication module (MCM) 470.

MOS Log module 420 may be a storage area in memory space 520 for storing events of trials to violate the SA 230 (FIG. 2) and or the GOS 215. The content of the MOS log module 420 may be used by MMDM 430 in order to decide on the type of action that MOS 400 has to take. Each entry in MOS LOG module 420 may include several fields. Exemplary field can be the time of the event, user's ID, type of the event, action that was taken, etc. In addition the MOS log module 420 can keep track of users of the computer that frequently try to violate the SA, problematic hours in which the trials are more frequent than the other hours etc. Based on this data MMDM may decide which policy will be used with certain user and/or time, etc.

The BOMSP 440 manages one or more security policies that are used by MOS 400. MOS security policies can be stored in the hard disk 286 and be loaded to RAM 284 after power-on or reset. From time to time the security policies may be updated by the administrator of the private network 120 (FIG. 1), while the user's computer 110 is connected over the private network 120. The updated policy may include updated information on certain user's ID that are not allowed to do certain activities, new user's, new devices, new rules, etc. After power-on or reset the integrity of the data stored in BOMSP 440 can be checked by the Boot-loader program that is stored in firmware 282 (FIG. 2). Checking the integrity can be done during loading the BOMSP 440 from the hard disk to RAM 284 (FIG. 2) by using cryptographic techniques such as but not limited to MD5. SHA-1 for calculating a hash value and comparing the calculated hash value to the one stored in the boot-loader firmware 282 (FIG. 2). In another exemplary embodiment of the present invention one or more policies can be stored in the boot-loader firmware 282.

Each security policy may comprise a plurality of rules that may operate to monitor and control read/write access to certain physical addresses of RAM 284 (FIG. 2). The rules within a security policy can be positive (i.e. allowances) or negative (i.e. restrictions). An exemplary rule that could exist in a security policy can be as follows: allow write access to certain addresses only if the current user is the administrator, and the current time is within a certain period (working hours, for example), if not reboot the machine. Another exemplary policy may define time intervals for triggering the ICM 450 to start an integrity test on the memory addressing space 220 and 230, which are associated with SA 230 or GOS 215, etc. For example, during the working period (8:00 am to 8:00 pm the time interval can be every five minutes, between 8:00 pm to 8:00 am the time interval can be shorter, one minute for example, etc.

From time to time, the stored content of the BOMSP 440 in the hard disk 286 (FIG. 2) can be checked and updated manually by the administrator of network 120 or automatically by the security server 130 (FIG. 1). From time to time, the MMDM 430 may perform an integrity check by using cryptographic technique, for example. The cryptographic technique can be such as but not limited to MD5. SHA-1 for calculating a hash value. The cryptographic algorithm may compare the calculated hash value to a stored hash value in the boot-loader firmware 282 and has been loaded by the boot-loader to a memory address in space 520 (FIG. 5). If the BOMSP 440 has been damaged or otherwise altered, the MMDM 430 may reboot the machine.

The MOS manager and decision maker (MMDM) 430 manages the operation of MOS 400. It can be initiated at the end of one of the earlier stages of the boot-loader process. After initiation MMDM 430 may proceed with the bootstrap process and start loading the GOS 215 (FIG. 2) and the SA 230 (FIG. 2). The MMDM 430 may start a setup mode. During set up mode ICM 450 can be triggered to check the integrity of the program stored in the memory addressing space 530 (FIG. 5) in the physical pages that have been allocated to the SA 230 (FIG. 2).

In other embodiments of the present invention the integrity of the entire memory space 530 is checked. If the response is positive then MMDM 430 may instruct MMU 281 to set break-point in selected memory pages that are relevant to the security agent 230 or certain device driver 220a-c (FIG. 2) or port driver 240a-c; to define certain memory pages as read only pages, etc. MMDM 430 can have a timer module that can be set to invoke the MMDM to start a checking process. Setting the period of the timer is depending on a relevant security policy that matches the current time and user for example. At the end of the setup mode MMDM may invoke the GOS 215 (FIG. 2). Initiating the GOS can be done by pointing the MMU 281 to the starting address page of space 530 in FIG. 2, for example. During the operation of GOS, MMDM 430 can be invoked from time to time by an interrupt from its timer or in case of a security event by an interrupt from MMU 281. The MMDM 430 is adapted to control the progress of MMU 281 in single step mode in order to analyze and determine the reason for the received interrupt.

The MOS communication module (MCM) 470 can be adapted to communicate with the MMU 281 (FIG. 2) in order to get status, interrupt, current virtual and/or physical address, etc. In the other direction MCM 470 may communicate the break-point locations to MMU 281, the pages that are define as read only pages etc.

In one exemplary embodiment of the present invention MCM 470 may be adapted to communicate with the SS 130 (FIG. 1) via network 120 (FIG. 1). In such embodiment, MCM 470 may further comprise a driver to a network interface board that is installed in the computer. On the other side, toward the GOS 215 (FIG. 2), the MCM 470 may comprise a simulator module. The simulator simulates the network interface board and communicates with the relevant port driver 240a-c (FIG. 2) of GOS 215. In such architecture MOS 400 and GOS 215 may have different private IP address to be used over network 120. Using its private IP address, MOS 400 can communicate with the SS 130.

ICM 450 is adapted to check the integrity of the data stored in the memory addressing space 530 (FIG. 5) of RAM 286. An exemplary ICM 450 may use a cryptographic technique such as but not limited to MD5. SHA-1 for calculating a hash value of the data stored in the memory pages in space 530 that have been allocated to the SA 230 (FIG. 2) and compare the calculated value with a stored hash. The stored hash value can be stored in the boot-loader firmware 282. Other exemplary embodiment of the present invention may use other methods for verifying the integrity of SA 230. For example, a check-sum method can be used to check changes in the stored information. In such an example the result of the checksum value can be stored in advanced in boot-loader firmware.

Other exemplary embodiment of the present invention may use code signing or digital certification process. The security agent can be signed by its vendor using a private key. The public key of the certification can be stored in boot-loader firmware 282 (FIG. 2). The public key can be used by the ICM 450 in order to validate the security agent code.

Yet in an alternate embodiment of the present invention, signing the code of the security agent can be done by a certificate that is signed by a certificate authority. Exemplary certificate authorities can be such as but not limited to Versign INC. Thawte Inc., etc. In such an embodiment of the present invention the public key of the certificate authority is stored in the boot-loader firmware and be retrieved and used by ICM 450 in order to validate the security agent code.

The integrity of GOS 215 can be verified by checking the operating system configuration files whether the registered service and/or drivers are the correct ones. For example, if GOS 215 is Windows™ (Microsoft) operating system then the configuration file is the Registry. The Registry includes information on the appropriate drivers and filters that are currently in use. This information can be compared to the one that is written in the appropriate security policy in BOMSP 440. More information on the operation of MOS 400 is depicted below in conjunction with FIG. 6 and FIG. 8.

FIG. 5 illustrates an exemplary system memory map 500 pointing the physical memory addresses of the program that is used by computer system 200 (FIG. 2). The map covers the memory addresses that are located in the boot-loader firmware 282 (FIG. 2) and in RAM 284. In the example of FIG. 5 a low address space portion 510 is occupied by the contents of the boot-loader firmware 282 (FIG. 2). The remainder of the address space can be associated with RAM 284. Addressing space 520 is allocated to MOS 260 (FIG. 2) and addressing space 530 is allocated to GOS 215 (FIG. 2). Addressing space 530 includes memory pages that are allocated to the SA 230. In an alternate exemplary embodiment of the present invention memory space 520, which is allocated to MOS 260, may reside in boot-loader firmware 282 and not in RAM 284.

Figure 6:
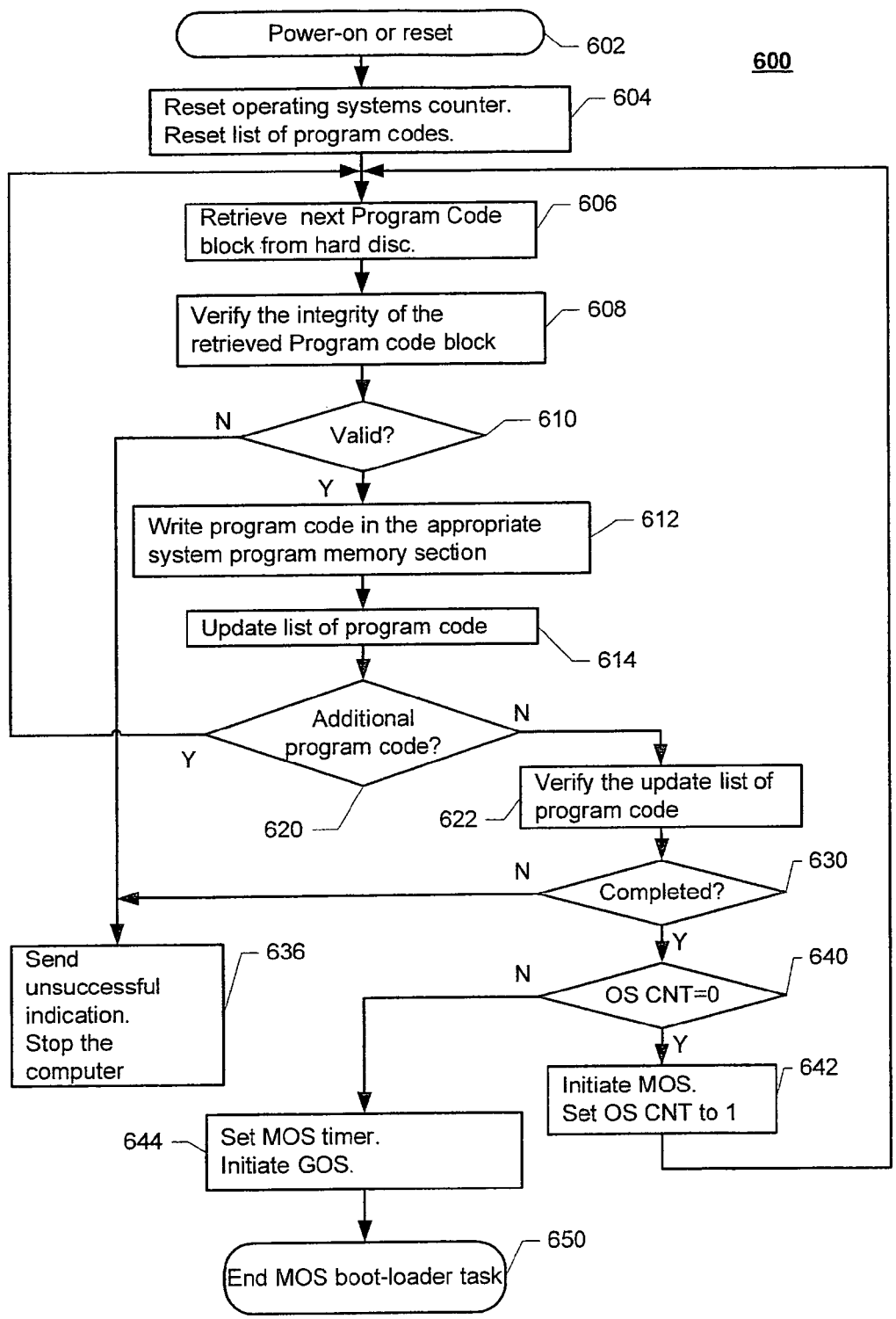

FIG. 6 illustrates a flowchart depicting relevant steps of an exemplary method 600. Method 600 may be initiated 602 by CPU 280 (FIG. 2) after power-on and/or reset when the instruction pointer register of CPU 280 is reset and the CPU starts executing the code that is located in the lowest memory addressing space 510 (FIG. 5) for initiating the bootstrap process. Method 600 is implemented in addition to a common operation of a boot-loader program, which is adapted to be used in the computer system 200 (FIG. 2) having GOS 215 as the operating system of the computer 200. The common operation of a boot-loader program may include processes like: loading the appropriate hard-disk driver, loading the keyboard driver, loading the mouse driver, loading the appropriate sectors from the hard-disk, etc.

In one exemplary embodiment of the present invention the process 600 can be embedded in the boot-loader firmware 282 (FIG. 2). In an alternate exemplary embodiment of the present invention the additional process 600 can be embedded in the MOS 260 (FIG. 2) and be stored in the hard disk 286 (FIG. 2) in appropriate sectors that are associated with the bootstrap process. Yet in another exemplary embodiment of the present invention the earlier portion of method 600, which is implemented during loading of the MOS, can be stored in the boot-loader firmware 282. The later stage of the process 600, which is implemented during loading of the GOS 215 (FIG. 2), can be implemented by the MOS 260 (FIG. 2). In the above exemplary embodiments of the present invention the common bootstrap process that is implemented by the GOS 215 may remain as is. Yet in an alternate exemplary embodiment of the present invention the boot-loader section of GOS 215 may be modified to include some of the functionalities of method 600.

At step 604 an Operating System Counter (OS CNT) and a list of program are reset. The OS CNT indicated which operating system is currently loaded. The list of program codes will be used for determining whether program codes that are relevant to the security of the network 120 (FIG. 1) were loaded. Method 600 may gather parameters that are needed for the integrity check. Exemplary parameters can be the physical location of the different blocks of code of SA 230 and/or GOS 215 (FIG. 2) in RAM 284 (FIG. 2); verification parameters, etc. The verification parameters depend on the method that is used for verifying the integrity of the program code, as it is disclosed below. Those parameters may include one or more of the following parameters, public key, hash values, checksum values, names of block of codes, sizes, etc. At step 606 CPU 280 is instructed to fetch the next block of program code from the hard-disk 286 (FIG. 2). At this stage of the bootstrap process, the next program code belongs to the MOS. Then an integrity checking process 608 can be initiated for verifying the validity of the fetched code.

The verification process 608 can be implemented by using a cryptographic technique such as but not limited to MD5. SHA-1. for example, for calculating a hash value for the fetched block codes and compares the calculated hash to a stored predefined one. The predefined hash can be calculated by the SS 130 (FIG. 1) or by the software vendor and be stored at the boot-loader firmware 282 (FIG. 2). In one exemplary embodiment of the present invention a signing method can be used. The signing method can use a public key cryptographic algorithm. Signing a block of program code can be done by the vendor of the code by using the private key and the authentication is done by using a public key. The public key can be stored in firmware 282 (FIG. 2) by the administrator of network 120.

Yet another exemplary verification method can be used by other exemplary embodiment of the present invention, for example checking the size of each block of code and compare it to a stored size, etc. The stored size can be calculated by SS 130 (FIG. 1) during loading the MOS 260, SA 230 and GOS 215 to the hard-disk 286 of computer system 200 (FIG. 2). The size, a list of names, and sizes can be stored by SS 130 in the boot-loader firmware 282 (FIG. 2) as verification parameters.

In another exemplary embodiment of the present invention step 608 and step 610 can be adapted to check the integrity of a block of program code that belongs to MOS 260 only. In such embodiment the validity of SA 230 and the integrity of the GOS can be checked by MOS 260 during on going operation of the system.

At the end of the authentication process a decision is made 610 whether the block of data is valid. If 610 not, an error message can be displayed 636 on a display that is associated to computer system 200 (FIG. 2) and method 600 stops the boot-loader process and may ask the user to reboot the computer. Alternatively or in addition a request for the password of the network administrator may be displayed. If 610 the block of code is valid, then method 600 proceed to step 612.

At step 612 the block of program code is stored in RAM 284 (FIG. 2). It can be stored in addressing space: 520 (FIG. 5) for a block that belongs to MOS 260 or in addressing space 530 (FIG. 5) for a block of code that belongs to SA 230 or GOS 215. Then a page table can be updated accordingly. Information on this block of program code is stored 614 in a list of program codes. The list of program codes can include information on the type of the block of code (a MOS, SA, driver, etc.), size, hash number (if exist), checksum value (if exist), virtual pages, physical pages, in which the block is stored in RAM 284 (FIG. 2), etc. The existence of the hash number and/or the checksum value depends on the method that is used for authenticating the integrity of the SA 230 and/or the GOS 215. The list can be stored in address space 520 that is associated by MOS 260. This information can be used by MOS 260 for checking the integrity of the SA 230 and/or the GOS 215 during the operation of computer system.

At step 620 a decision is made whether additional blocks of program code exist in the hard-disk. If 620 yes, method 600 return to step 604 for fetching the next block from the hard-disk 286 (FIG. 2). If 620 there are no additional blocks of program code to be fetched from the hard-disk 286, then the list of program codes can be compared to a list of required blocks of code. The list of required blocks of code can be stored in boot-loader firmware 282 by the administrator of network 120 (FIG. 1). The list can define mandatory blocks of code, which belong to MOS 260, SA 230 or GOS 215 (FIG. 2) and are mandatory from the security of network 120 (FIG. 1). Any missing block can affect the safety of the organization.

If 630 the list of program codes is not completed and does not include all the program blocks that are mentioned in the list of required blocks of code. Then an error message can be displayed 636 on a display that is associated to computer system 200 (FIG. 2) and method 600 can stop the boot-loader process.

If 630 the list of program codes is completed, then the value of the OS CNT is checked 640. If the value of the OS CNT is zero, indicating that the bootstrap process loads the MOS 260 (FIG. 2). Then, the MOS process can be initiated 642, OS CNT is set to one and the MOS return to step 606 to continue the bootstrap process for loading blocks of program codes that belong to the GOS 215 (FIG. 2) from the hard-disk 286. Those codes are stored in memory section 530 (FIG. 5) of RAM 281 (FIG. 2). Initiating the MOS can be done by setting the instruction pointer register of the CPU 280 (FIG. 2) to the first address of memory section 520 (FIG. 5).

If 640 the value of the OS CNT is other than zero, which indicates that the bootstrap process loads the GOS and the GOS can be initiated, then 644 a timer that is associated with MOS 260 (FIG. 2) is initiated. The timer period can be in the range of few seconds to few minutes. Then, GOS 215 (FIG. 2) is initiated, the instruction pointer register of CPU 280 (FIG. 2) is loaded with the address of first page in addressing space 530 (FIG. 5). The MOS boot-loader task is terminating 650 and the interrupt system of CPU 280 is allowed. The GOS 215 and MOS 260 (FIG. 2) start their ongoing operation. In one exemplary embodiment of the present invention process 644 may further include updating the MMU 281 (FIG. 2) with the relevant protected pages (zones) in RAM 284 that are associated with the MOS, SA and GOS. Some of those pages can be defined as read only pages; break-points can be associated with other protected pages such as pages that are relevant to the security agent 230 or certain device driver 220*a-c* (FIG. 2) or port driver 240*a-c*. In another exemplary embodiment of the present invention the boot-loader program, during process 632 (FIG. 6) may update the MMU 281 with the protected zones.

Figure 7:
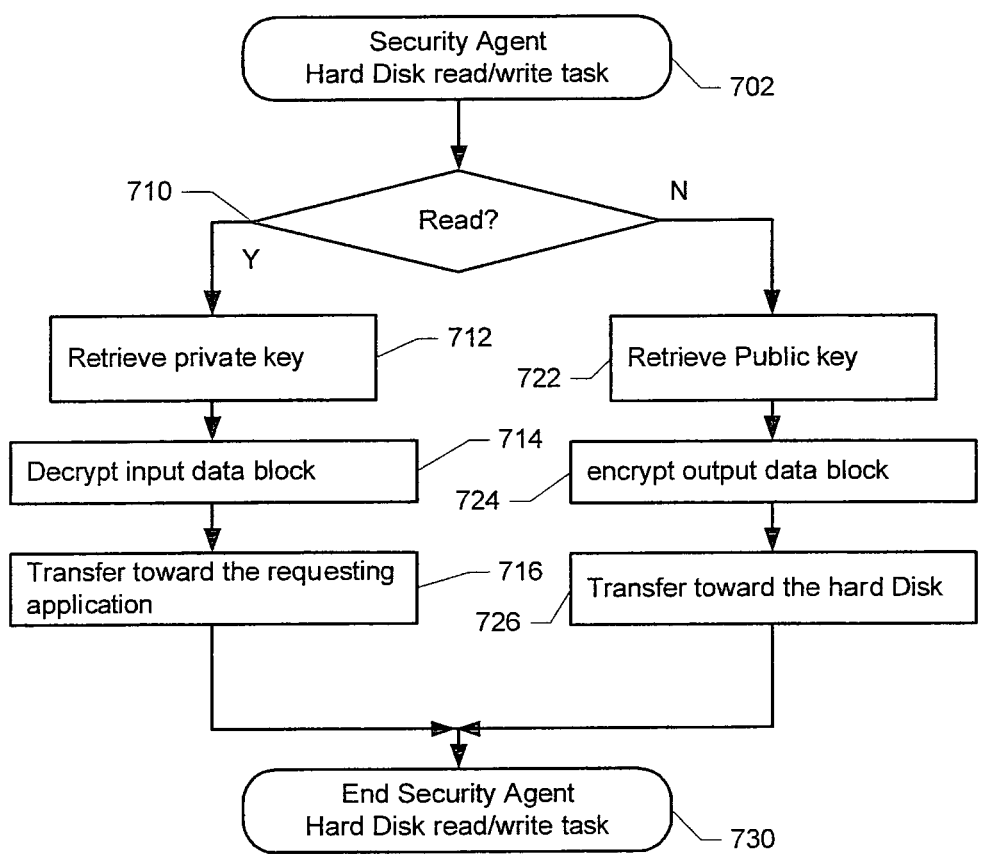
FIG. 7 illustrate a flowchart with relevant steps of an exemplary method for associating the content of an hard disk with the security agent.

FIG. 7 illustrates a flowchart depicting relevant steps of an exemplary method 700. Method 700 may be used by SA 230 (FIG. 2) in order to associated the content of the hard-disk 286 (FIG. 2) with the operation of the SA 230. Process 700 may use encryption/decryption method for associating the SA 230 and the content of the hard-disk 286. Method 700 can be initiated in each read/write cycle to the hard-disk 286, after the SA determined that the request is allowed according to a current used security policy. The encryption/decryption method that is used by process 700 can be one of common encryption/decryption methods that are known to those skilled in the art. Exemplary encryption/decryption methods may include private key methods or symmetrical key methods. Exemplary encryption/decryption algorithm may include: RSA, AES, DES, 3DES, and RC4.

At step 710 a decision is made whether the cycle is a read cycle. If yes, then the private key is retrieved 712 from its location in memory addressing space 530 (FIG. 5) that is associated to the SA 230. The private key was stored during the boot-loader program. In case of using symmetrical key encryption algorithm then the private key is replaced by the symmetrical key.

At step 714 the retrieved block of data from the hard-disk 286 is decrypted using the retrieved key and according to the encryption/decryption algorithm that is used in process 700. The decrypted block of data is transferred 716 via the hard-disk device driver 220 (FIG. 2) toward an application program 210a-c (FIG. 2) that initiated the read command. Then process 700 is terminating 730.

Returning now to step 710 in which a decision is made whether the cycle is a read cycle. If no, which means that it is a write cycle to the hard-disk 286 (FIG. 2), then the public key is retrieved 722 from its location in memory addressing space 530 (FIG. 5) that is associated to the SA 230. The public key was stored during the boot-loader program. In case of using symmetrical key encryption algorithm then the public key is replaced by the symmetrical key.

At step 724 the block of data that has to be stored in the hard-disk 286 is encrypted using the retrieved key and according to the encryption/decryption algorithm that is used in process 700. The encrypted block of data is transferred 726 via the appropriate port driver 220 (FIG. 2) toward the hard-disk 286 (FIG. 2) and process 700 is terminating 730. The appropriate port driver 240 depends on the physical port to which the hard-disk is connected. Exemplary port drivers can be USB, SCSI port driver, for example.

Other exemplary embodiment of the present invention may use other methods for associating the content of the hard-disk 286 (FIG. 2) to the operation of the SA 230 (FIG. 2). One exemplary method may encrypt/decrypt the directory of the hard-disk 284 and not the entire content. In such embodiment of the present invention method 700 can be adapted to encrypt/decrypt just the read/write cycles to the directory of the hard-disk 286.

An alternate exemplary embodiment of the present invention may associate the content of the hard-disk with a virtual user and any allow read/write access to the hard-disk only to the virtual user. In such a case every access to hard-disk 286 (FIG. 2) may be followed by a request for the virtual user name and password. The SA 230 can be adapted to emulate the virtual user and to respond to the requests by delivering a name and a password that were stored in the boot-loader firmware 282 during stamping the firmware by the SS 130 (FIG. 1). Those values can be stored during the boot-loader program in the memory addressing space that is associated with the SA.

In such an embodiment of the present invention method 700 can be modified. Step 724 can be modified to calculate a hash value to be associated with the current block of data and to be stored with it in the hard-disk. Step 714 can be modified to authenticate the virtual user (SA 230) name and password by calculating a hash value for each block of data that is currently read and comparing it to the stored associated hash number that was calculated during the writing cycle of the same block of data.

Figure 8:
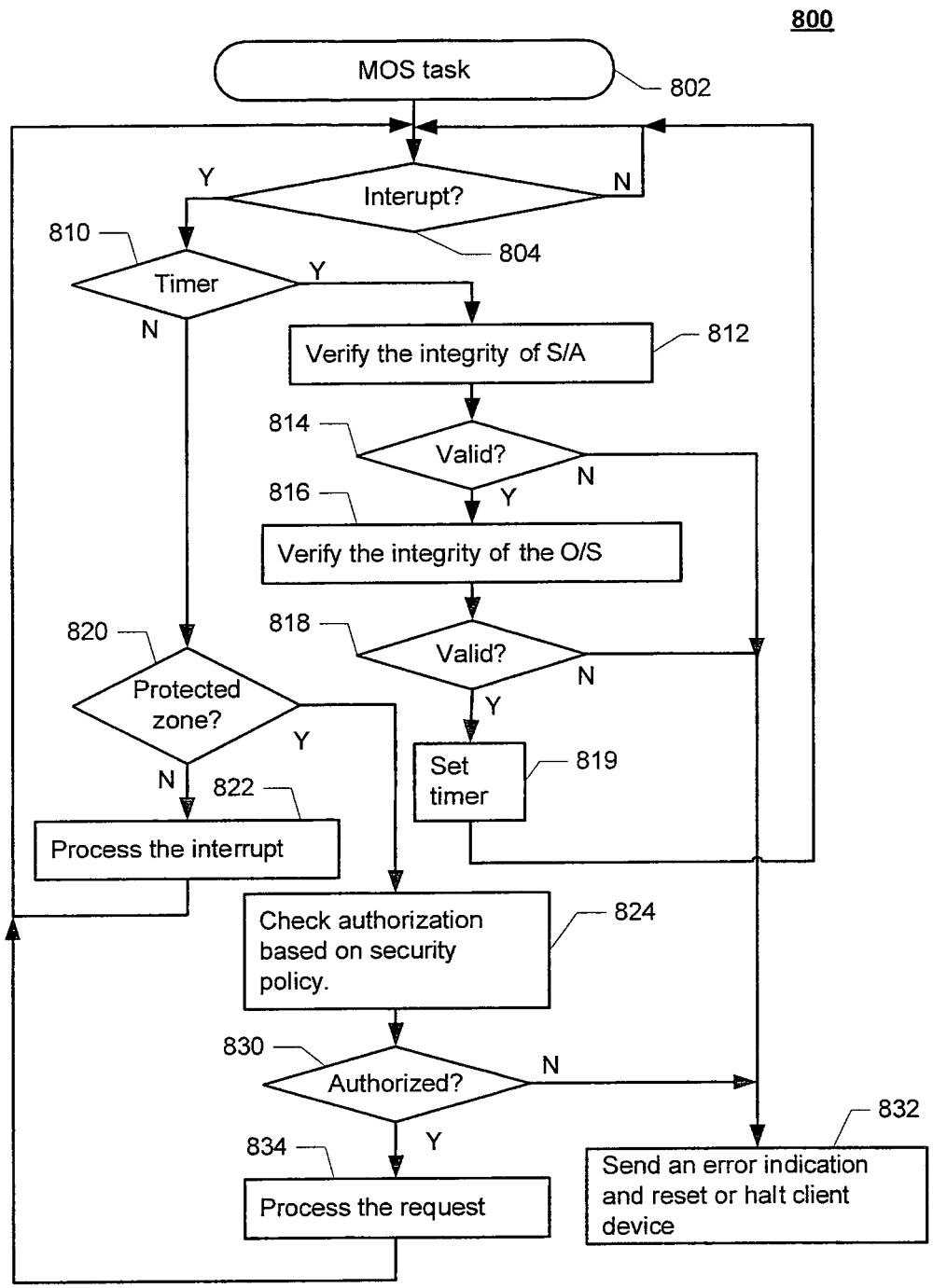
FIG. 8 illustrates a flowchart with relevant steps of an exemplary method for verifying the integrity of the security agent and/or the operating system.

FIG. 8 illustrates a flowchart depicting relevant steps of an exemplary method 800. Method 800 can be used by an exemplary embodiment of MOS 260 (FIG. 2) for checking the integrity of the SA 230 program code with or without the integrity of the GOS 215 (FIG. 2) during the ongoing operation of the computer system 200 (FIG. 2). Method 800 can be initiated 802 at the end of method 6000 when the interrupt system of the CPU 280 (FIG. 2) is allowed.

After initiation, method 800 may wait 804 for an interrupt. During the boot-loader program the CPU 280 (FIG. 2) can be set to response to an interrupt by setting the instruction pointer register of the CPU to the appropriate physical address of the program code of method 800 in memory addressing space 520 (FIG. 5). When an interrupt is received, a decision is made 810 whether the interrupt was sent by a timer that was set in step 644 (FIG. 6). If yes, then the integrity of the SA and the GOS is checked, steps 812, 814, 816 and 818. Checking the integrity of the SA and the GOS code (step 812 and 816 respectively) that is stored in RAM 284 (FIG. 2) memory section 530 (FIG. 5) can be done by using similar methods to the ones that is depicted above in conjunction with FIG. 6 steps 608.

If both modules, the SA 230 and the GOS 215 are valid (step 814 and 818 respectively), then the timer is reset 819 and method 800 returns to step 802 waiting for the next interrupt. If one of those modules is not valid (step 812 and 816), then an error message can be displayed 832 on the display that is associated to computer system 200 (FIG. 2) and method 800 may reset or stop the computer 200 (FIG. 2).

If 810 the interrupt was not sent from the timer, then a decision is made 820 whether the interrupt was initiated as an indication to an access to one of the protected zones in memory addressing space 520 and/or 530 (FIG. 5). The protected zones may include pages that are associated with the SA 230, MOS 260, and GOS 215 (FIG. 2) etc. If 820, the interrupt is not a result of accessing to one of the protected zones, then the interrupt is transferred to GOS to be processed 822 and method 800 returns to step 804 waiting for the next interrupt.

If 820 the interrupt was initiated due to a trial to access one of the protected pages, then an authorization process 824 can be initiated. During the authorization process 824 a single step mode can be used via MMU 281 and controlled by method 800 in order to determine whether the access is legal. The decision can be based on the current policy, from the BOMSP 440 (FIG. 4) that is used by MMDM 430 (FIG. 4). Following are few examples of the authorization process. Example 1: the interrupt was initiated during a trial to access a page that is associated with MOS 260 (a page in addressing space 520 FIG. 5). Then, the access will be authorized only if the current user is the administrator of the network 120 (FIG. 1). Example 2: the interrupt was initiated during a trial to write a new device driver into a page that is associated with the configuration file of GOS 215 (a page that is associated the registry of GOS in addressing space 530 FIG. 5, for example). The access will be authorized only if device driver can be authenticated and is allowed by the current policy. Example 3: the interrupt was initiated during a trial to write into a page that is associated with the protected file of GOS 215. However the access was done by the security agent code therefore the access will be authorized, etc.

At the end of the authorization process a decision is made 830 whether to authorize the request to access the protected zone, if not an error message can be displayed 832 on the display that is associated to computer system 200 (FIG. 2) and method 800 may reset or stop the computer. If 830 yes, then the interrupt is transferred to GOS to be processed 834 and method 800 returns to step 804 waiting for the next interrupt.

In this application, the words "unit", "task", and "module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware.

In the description and claims of the present disclosure, each of the verbs, "comprise", "include", "have", and conjugates thereof, are used to indicate that the object or objects of the verb are not necessarily a complete listing of members, components, elements or parts of the subject or subjects of the verb.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The described embodiments comprise different features, not all of which are required in all embodiments of the invention. Some embodiments of the present invention utilize only some of the features or possible combinations of the features. Different combinations of features noted in the described embodiments will occur to persons skilled in the art. The scope of the invention is limited only by the following claims.

What is claimed is:

1. A method for protecting a security agent that is installed in a computer device, the method comprising:
by a processor of the computer device,
loading from a boot-loader firmware of said computer device, during a boot process of said computer device, a Mini Operating System (MOS) as a host operating system that hosts a Guest Operating System (GOS);
loading the MOS into a first memory section of said computer device that is transparent to the GOS;
wherein the MOS continues said boot process by loading the GOS from a persistent storage unit of the computer device into a second memory section of said computer device;
loading said security agent into Random Access Memory (RAM) of said computer device, wherein the security agent is configured to enforce a pre-defined security policy for the computer device during ongoing execution of operations by a user application on the computer device; wherein said security agent comprises an encryption-and-decryption engine, and intercepts data transportations between user applications and said persistent storage unit;
wherein the encryption-and-decryption engine of said security engine encrypts data transferred from the user application to said persistent storage unit by utilizing a cryptographic public key that is initially stored in said persistent storage unit and that is loaded by said boot-loader firmware into said RAM during said boot process;
wherein the encryption-and-decryption engine of said security engine decrypts data transferred from said hard disk to the user application by utilizing a cryptographic private key which is initially stored within said boot-loader firmware and that is loaded by said boot-loader firmware into said RAM during said boot process;
wherein (i) said security agent, and (ii) content of said persistent storage unit, and (iii) the boot-loader firmware, are bonded by said cryptographic private key that is initially stored in the boot-loader firmware of said computer device;
wherein said encryption-and-decryption engine of said security engine is activated upon any attempt of user applications to read data from said persistent storage unit or to write data to said persistent storage unit;
at the MOS, verifying and protecting the integrity of the security agent that is stored on said persistent storage unit and is loaded to said RAM, (a) by verifying that the security agent is not bypassed by other code while a user application is running, and (b) by verifying that the security agent was not modified to ignore a limiting policy, and (c) by verifying that the encryption-and-decryption engine of the security agent was not disabled.

2. A computer device, comprising:
a persistent storage unit to store data and code;
a hardware processor to execute code;
wherein the processor is to load from a boot-loader firmware of said computer device, during a boot process of said computer device, a Mini Operating System (MOS) as a host operating system that hosts a Guest Operating System (GOS);
wherein the MOS is loaded into a first memory section of said computer device that is transparent to the GOS;
wherein the MOS continues said boot process by loading the GOS from a persistent storage unit of the computer device into a second memory section of said computer device;
wherein said security agent is loaded into Random Access Memory (RAM) of said computer device, and is configured to enforce a pre-defined security policy for the computer device during ongoing execution of operations by a user application on the computer device; wherein said security agent comprises an encryption-and-decryption engine, and intercepts data transportations between user applications and said persistent storage unit;
wherein the encryption-and-decryption engine of said security engine encrypts data transferred from the user application to said persistent storage unit by utilizing a cryptographic public key that is initially stored in said persistent storage unit and that is loaded by said boot-loader firmware into said RAM during said boot process;
wherein the encryption-and-decryption engine of said security engine decrypts data transferred from said hard disk to the user application by utilizing a cryptographic private key which is initially stored within said boot-loader firmware and that is loaded by said boot-loader firmware into said RAM during said boot process;
wherein (i) said security agent, and (ii) content of said persistent storage unit, and (iii) the boot-loader firmware, are bonded by said cryptographic private key that is initially stored in the boot-loader firmware of said computer device;
wherein said encryption-and-decryption engine of said security engine is activated upon any attempt of user applications to read data from said persistent storage unit or to write data to said persistent storage unit;
wherein the MOS is to verify and protect the integrity of the security agent that is stored on said persistent storage unit and is loaded to said RAM, (a) by verifying that the security agent is not bypassed by other code while a user application is running, and (b) by verifying that the security agent was not modified to ignore a limiting policy, and (c) by verifying that the encryption-and-decryption engine of the security agent was not disabled.

3. The computer device of claim 2,
wherein, during loading of the GOS, the MOS is to check the integrity of the security agent;
wherein, during loading of the GOS, the MOS is to check the integrity of the GOS;
wherein, during ongoing operation of the user application, the MOS is to check the integrity of the security agent;
wherein, during ongoing operation of the user application, the MOS is to check the integrity of the GOS.

4. The computer device of claim 2, wherein the MOS is: (a) to manipulate a virtual paging mechanism of the GOS, and (b) to define pages of the GOS as read-only, and (c) to define pages of the security agent as read-only;
wherein the MOS is invoked upon an attempt of a hostile application to try to write to one of said pages, via a page fault interrupt.

5. The computer device of claim 2, wherein the MOS is stored on top of a Virtual Machine Monitor (VMM) of said computer device, and configuring the MOS to follow current activity of the computer device and to determine whether the current activity violates the security agent.

6. The computer device of claim 2,
wherein the MOS is configured to follow current activity of the computer device and to determine whether the current activity violates the security agent;
wherein the MOS is configured to trace activity of the computer device by placing break-points in selected virtual memory pages that are relevant to said security agent;
wherein the MOS is configured to trace activity of the computer device by placing break-points in selected virtual memory pages that are relevant to a particular device driver of said computer device;
wherein the MOS is configured to trace activity of the computer device by placing break-points in selected virtual memory pages that are relevant to a particular port driver of said computer device;
wherein the MOS is configured to define one or more memory pages as read-only pages; and upon an attempt by a hostile code to write to one of said read-only pages, a page fault interrupt is invoked and the MOS prevents a write operation.

7. The computer device of claim 2, wherein the computer device implements a virtual memory pages system, wherein the MOS is implemented by a transparent software module that traces physical pages of program memory addresses;
wherein the MOS comprises an Addressing Inspection Module (AIM) and a Physical to Virtual Translating Module (PtVTM);
wherein the MOS performs a tracing technique that utilizes breakpoints and page-fault interrupts to identify an attempt to violate the security agent;
wherein the MOS performs a tracing technique that utilizes breakpoints and page-fault interrupts to identify an attempt to violate the MOS.

8. The computer device of claim 2, wherein the computer device implements a virtual memory pages system, wherein the MOS is implemented by a transparent software module that traces physical pages of program memory addresses;
wherein the MOS comprises an Addressing Inspection Module (AIM) and a Physical to Virtual Translating Module (PtVTM);
wherein the MOS performs a tracing technique that utilizes breakpoints and page-fault interrupts to identify an attempt to violate the security agent;
wherein the MOS performs a tracing technique that utilizes breakpoints and page-fault interrupts to identify an attempt to violate the MOS
wherein the MOS is to trace one or more addressing spaces of program memory; and if a code requests an access to a traced physical memory page, then the MOS is invoked.

9. The computer device of claim 2, wherein the computer device implements a virtual memory pages system, wherein the MOS is implemented by a transparent software module that traces physical pages of program memory addresses;
wherein the MOS performs a tracing technique that utilizes breakpoints and page-fault interrupts to identify an attempt to violate the security agent;
wherein the MOS performs a tracing technique that utilizes breakpoints and page-fault interrupts to identify an attempt to violate the MOS
wherein the MOS is to trace one or more addressing spaces of program memory; and if a code requests an access to a traced physical memory page, then the MOS is invoked;
wherein the MOS determines locations for placing traces of said addressing spaces, after termination of a boot-loader process of said computer device, by utilizing a kernel driver associated with the security agent;
wherein, based on a kernel driver start value and a kernel driver size value in a device object of said kernel driver, the MOS determines one or more memory pages in which said kernel driver, which is associated with the security agent, is found.

10. The computer device of claim 2, wherein the security agent comprises a Parameter Gathering Module (PGM) configured to perform:
(a) detecting a newly-connected storage device that is newly-connected to said computer device;
(b) gathering information parameters that are relevant to said newly-connected storage device;
(c) generating a cryptographic stamp for said newly-connected storage device, based on the information parameters of said newly-connected device as gathered by said PGM;
(d) based on said information parameters of said newly-connected storage device, and based on a Bank of Security Policies (BoSP) defining a plurality of rules for controlled access to storage devices, determining whether to permit or to deny data transportation between the storage device and the computer device.

11. The computer device of claim 2, wherein the security agent comprises a Parameter Gathering Module (PGM) configured to perform:
(a) detecting a newly-connected storage device that is newly-connected to said computer device;
(b) gathering information parameters that are relevant to said newly-connected storage device, wherein the information parameters comprise at least: a volume of storage of said newly-connected storage device;
(c) based on said information parameters of said newly-connected storage device, and based on a Bank of Security Policies (BoSP) defining a plurality of rules for controlled access to storage devices, determining whether to permit or to deny data transportation between the storage device and the computer device;
wherein the determining of step (c) comprises: denying data transportation between the storage device and the computer device unless the volume of storage of the storage device falls between pre-defined threshold values.

12. The computer device of claim 2,
wherein said boot-loader firmware of the computer device comprises a program that loads a first portion of the MOS from the persistent storage unit of the computer device to said RAM of the computer device;
wherein the first portion of the MOS is sufficient for continuing to load a remaining portion of the MOS from the persistent storage unit of the computer device to the RAM of the computer device;
wherein said MOS is adapted to load the GOS, including said security agent therein, and to validate the integrity of the loaded security agent;
wherein said boot-loader firmer receives from a remote security server, one or more verification parameters and one or more encryption/decryption keys that are utilized by the security agent.

13. The computer device of claim 2,
wherein said boot-loader firmware of the computer device comprises a program that loads a first portion of the MOS from the persistent storage unit of the computer device to said RAM of the computer device;
wherein the first portion of the MOS is sufficient for continuing to load a remaining portion of the MOS from the persistent storage unit of the computer device to the RAM of the computer device;
wherein said MOS is adapted to load the GOS, including said security agent therein, and to validate the integrity of the loaded security agent;
wherein the method comprises: mapping said RAM of the computer device to allocate an initial RAM space as memory space for the boot-loader firmware, to allocate a second, contagious, RAM space as memory space for the MOS, and to allocate a third, contagious, RAM space as memory space for the GOS including therein a memory space of the security agent.

14. The computer device of claim 2 wherein the MOS is configured to perform:
checking the integrity of an entirety of said RAM of the computer device;
setting break-points in selected memory pages that are relevant to the security agent;
setting break-points in selected memory pages that are relevant to a particular device driver;
setting break-points in selected memory pages that are relevant to a particular port driver;
defining one or more memory pages as read-only pages;
utilizing a timer module that is set to invoke the MOS to start a checking process, wherein a time period of the timer module is set based on a particular security policy that matches a current time and a current user;
wherein only subsequently to the above steps, the GOS is invoked and initiated by pointing a Memory Management Unit (MMU) of the computer device to the starting address page of RAM memory space allocated to the GOS;
wherein during operation of the GOS, the MOS is invoked by an interrupt from said timer module.

15. The computer device of claim 2, wherein the MOS comprises an Integrity Checking Module (ICM) to check the integrity of the security agent, by calculating a cryptographic hash value of the data stored in particular memory pages in a memory addressing space that were allocated to the security agent, and by comparing the calculated cryptographic hash value with a reference hash value that was stored in advance in the boot-loader firmware.

16. The computer device of claim 2, wherein the MOS is to log events of trials to violate the security agent, and to track a user of the computer device that frequently tries to violate the security agent;
wherein based on tracking of said user, determining which security policy to apply from a bank of security policies.

17. The computer device of claim 2, wherein the MOS is to log events of trials to violate the security agent, and to determine a time-slot in which trials to violate the security agent are more frequent relative to other time-slots;
based on said time-slot, to determine which security policy to apply from a bank of security policies.

18. The computing device of claim 2, wherein the security agent is to apply a security policy that authorizes a current user to access certain memory addresses only if (i) the current user is an administrator, and (ii) a current time is within a pre-defined time period.

19. The computing device of claim 2, wherein during the boot process, code of the MOS is loaded from the persistent storage unit to a particular memory address space in said RAM of the computer device, which is adjacent to and is contagious with and is above a memory address space of said RAM in which a boot-loader program is stored;
wherein the boot-loader program is to verify the validity of the loaded MOS, by using a cryptographic hashing technique that utilizes a cryptographic private key that is stored in the boot-load firmware of the computer device.

20. The computer device of claim 2, wherein during the boot process, code of the MOS is loaded from the persistent storage unit to a particular memory address space in said RAM of the computer device, which is adjacent to and is contagious with and is above a memory address space of said RAM in which a boot-loader program is stored;
wherein the boot-loader program is to verify the validity of the loaded MOS, by using a cryptographic hashing technique that utilizes a cryptographic private key that is pre-stored in the boot-load firmware of the computer device prior to installation of the boot-load firmware in the computer device.

* * * * *